(12) United States Patent
Li et al.

(10) Patent No.: US 11,065,604 B2
(45) Date of Patent: Jul. 20, 2021

(54) CATALYST FOR PRODUCING LIGHT AROMATICS WITH HEAVY AROMATICS, METHOD FOR PREPARING THE CATALYST, AND USE THEREOF

(71) Applicants: China Petroleum & Chemical Corporation, Beijing (CN); Shanghai Research Institute of Petrochemical Technology, SINOPEC, Shanghai (CN)

(72) Inventors: Jingqiu Li, Shanghai (CN); Dejin Kong, Shanghai (CN); Huaying Li, Shanghai (CN); Deqin Yang, Shanghai (CN); Weiyi Tong, Shanghai (CN); Jian Ding, Shanghai (CN); Min Hou, Shanghai (CN); Yan Chen, Shanghai (CN); Xuemei Chen, Shanghai (CN); Liangkai Wang, Shanghai (CN)

(73) Assignees: CHINA PETROLEUM & CHEMICAL CORPORATION, Beijing (CN); SHANGHAI RESEARCH INSTITUTE OF PETROCHEMICAL TECHNOLOGY, SINOPEC, Shanghai (CN)

( * ) Notice: Subject to any disclaimer, the term of this patent is extended or adjusted under 35 U.S.C. 154(b) by 112 days.

(21) Appl. No.: 16/105,293

(22) Filed: Aug. 20, 2018

(65) Prior Publication Data
US 2019/0054450 A1    Feb. 21, 2019

(30) Foreign Application Priority Data

Aug. 18, 2017   (CN) .......................... 201710709584.3
Aug. 18, 2017   (CN) .......................... 201710709585.8

(Continued)

(51) Int. Cl.
*B01J 21/04*    (2006.01)
*B01J 21/12*    (2006.01)
(Continued)

(52) U.S. Cl.
CPC ............... *B01J 23/42* (2013.01); *B01J 21/04* (2013.01); *B01J 21/06* (2013.01); *B01J 21/063* (2013.01);
(Continued)

(58) Field of Classification Search
CPC ... B01J 20/04; B01J 21/12; B01J 21/16; B01J 23/42; B01J 23/44; B01J 23/46;
(Continued)

(56) References Cited

U.S. PATENT DOCUMENTS 2,908,654 A * 10/1959 Shalit ...................... C07C 5/367
502/230
2,992,985 A * 7/1961 Huffman ................ C10G 35/09
208/138

(Continued)

FOREIGN PATENT DOCUMENTS

| CN | 102688770 A | 9/2012 |
| CN | 103666553 A | 3/2014 |
| CN | 104117386 A | 10/2014 |

*Primary Examiner* — Cam N. Nguyen
(74) *Attorney, Agent, or Firm* — Novick, Kim & Lee, PLLC; Allen Xue

(57) ABSTRACT

A catalyst for producing light aromatics with heavy aromatics, a method for preparing the catalyst, and a use thereof are disclosed. The catalyst comprises a carrier, component (1), and component (2), wherein component (1) comprises one metal element or more metal elements selected from a group consisting of Pt, Pd, Ir, and Rh, and component (2) comprises one metal element or more metal elements selected from a group consisting of IA group, IIA group, IIIA group, IVA group, IB group, IIB group, IIIB group, IVB group, VB group, VIB group, VIIB group, La group, and VIII group (Continued)

other than Pt, Pd, Ir, and Rh. The catalyst can be used for producing light aromatics with heavy aromatics, whereby heavy aromatics hydrogenation selectivity and light aromatics yield can be improved.

24 Claims, 1 Drawing Sheet

(30) Foreign Application Priority Data

| Aug. 18, 2017 | (CN) | ......................... | 201710709601.3 |
|---|---|---|---|
| Aug. 18, 2017 | (CN) | ......................... | 201710709602.8 |
| Aug. 18, 2017 | (CN) | ......................... | 201710709603.2 |
| Aug. 18, 2017 | (CN) | ......................... | 201710709605.1 |
| Aug. 18, 2017 | (CN) | ......................... | 201710709607.0 |
| Aug. 18, 2017 | (CN) | ......................... | 201710709612.1 |
| Aug. 18, 2017 | (CN) | ......................... | 201710709613.6 |
| Aug. 18, 2017 | (CN) | ......................... | 201710709621.0 |
| Aug. 18, 2017 | (CN) | ......................... | 201710709622.5 |

(51) Int. Cl.

| *B01J 21/16* | (2006.01) |
|---|---|
| *B01J 23/42* | (2006.01) |
| *B01J 23/44* | (2006.01) |
| *B01J 23/46* | (2006.01) |
| *B01J 23/50* | (2006.01) |
| *B01J 23/58* | (2006.01) |
| *B01J 23/60* | (2006.01) |
| *B01J 23/62* | (2006.01) |
| *B01J 23/63* | (2006.01) |
| *B01J 23/64* | (2006.01) |
| *B01J 23/89* | (2006.01) |
| *B01J 27/08* | (2006.01) |
| *B01J 27/10* | (2006.01) |
| *B01J 27/12* | (2006.01) |
| *B01J 27/122* | (2006.01) |
| *B01J 27/125* | (2006.01) |
| *B01J 27/13* | (2006.01) |
| *B01J 27/132* | (2006.01) |
| *B01J 27/135* | (2006.01) |
| *B01J 27/138* | (2006.01) |
| *B01J 35/08* | (2006.01) |
| *B01J 37/02* | (2006.01) |
| *B01J 37/08* | (2006.01) |
| *C10G 11/02* | (2006.01) |
| *C10G 45/52* | (2006.01) |
| *B01J 21/06* | (2006.01) |
| *B01J 23/652* | (2006.01) |
| *B01J 23/656* | (2006.01) |
| *B01J 23/648* | (2006.01) |

(52) U.S. Cl.
CPC ............. *B01J 21/066* (2013.01); *B01J 23/44* (2013.01); *B01J 23/46* (2013.01); *B01J 23/50* (2013.01); *B01J 23/58* (2013.01); *B01J 23/60* (2013.01); *B01J 23/62* (2013.01); *B01J 23/626* (2013.01); *B01J 23/63* (2013.01); *B01J 23/6482* (2013.01); *B01J 23/6484* (2013.01); *B01J 23/6525* (2013.01); *B01J 23/6527* (2013.01); *B01J 23/6562* (2013.01); *B01J 23/6567* (2013.01); *B01J 23/892* (2013.01); *B01J 23/8906* (2013.01); *B01J 23/8913* (2013.01); *B01J 23/8926* (2013.01); *B01J 23/8953* (2013.01); *B01J 27/08* (2013.01); *B01J 35/08* (2013.01); *B01J 37/0205* (2013.01); *B01J 37/0207* (2013.01); *B01J 37/0242* (2013.01); *B01J 37/088* (2013.01); *C10G 11/02* (2013.01); *C10G 45/52* (2013.01); *B01J 2523/822* (2013.01); *B01J 2523/824* (2013.01); *B01J 2523/827* (2013.01); *B01J 2523/828* (2013.01); *C10G 2300/1096* (2013.01); *C10G 2300/4006* (2013.01); *C10G 2300/70* (2013.01); *C10G 2400/30* (2013.01)

(58) Field of Classification Search
CPC ... B01J 23/50; B01J 23/58; B01J 23/60; B01J 23/62; B01J 23/626; B01J 23/63; B01J 23/6482; B01J 23/6484; B01J 23/6525; B01J 23/6527; B01J 23/6562; B01J 23/6567; B01J 23/8906; B01J 23/8913; B01J 23/892; B01J 23/8926; B01J 23/8953; B01J 27/08; B01J 27/10; B01J 27/12; B01J 27/122; B01J 27/125; B01J 27/13; B01J 27/132; B01J 27/135; B01J 27/138; B01J 35/08; B01J 23/896; B01J 23/8966; B01J 23/898; B01J 23/8993; B01J 37/0205; B01J 37/0207; B01J 37/0242; B01J 37/088; C10G 11/02; C10G 45/52
USPC .................................................. 502/300–439
See application file for complete search history.

(56) References Cited

U.S. PATENT DOCUMENTS

| 3,017,369 | A | * | 1/1962 | Nixon | ...................... | B01J 27/13 |
|---|---|---|---|---|---|---|
| | | | | | | 502/230 |
| 3,248,449 | A | * | 4/1966 | Goble | ...................... | B01J 23/58 |
| | | | | | | 585/669 |
| 3,318,821 | A | * | 5/1967 | Bloch | ...................... | B01J 21/16 |
| | | | | | | 502/231 |
| 3,524,808 | A | * | 8/1970 | Van Weeren | .......... | C10G 47/10 |
| | | | | | | 208/111.05 |
| 3,620,960 | A | * | 11/1971 | Kozlowski | ............... | B01J 27/12 |
| | | | | | | 208/60 |
| 3,830,723 | A | * | 8/1974 | Ladeur | ..................... | B01J 37/20 |
| | | | | | | 208/108 |
| 3,840,475 | A | * | 10/1974 | Davis | ................... | C10G 35/095 |
| | | | | | | 502/227 |
| 4,183,805 | A | * | 1/1980 | Antos | .................. | B01J 23/6567 |
| | | | | | | 208/111.05 |
| 4,197,188 | A | * | 4/1980 | Antos | ................. | B01J 23/6567 |
| | | | | | | 208/112 |
| 4,206,040 | A | * | 6/1980 | Antos | ................. | B01J 23/6567 |
| | | | | | | 208/112 |
| 4,231,897 | A | * | 11/1980 | Antos | ................. | B01J 23/6567 |
| | | | | | | 502/226 |
| 4,238,366 | A | * | 12/1980 | Antos | ................. | B01J 23/6567 |
| | | | | | | 502/230 |
| 4,250,020 | A | * | 2/1981 | Antos | ................. | B01J 23/6567 |
| | | | | | | 208/138 |
| 4,256,566 | A | * | 3/1981 | Antos | ................. | B01J 23/6567 |
| | | | | | | 208/139 |
| 4,256,608 | A | * | 3/1981 | Antos | .................. | C10G 35/09 |
| | | | | | | 208/138 |
| 4,290,921 | A | * | 9/1981 | Antos | .................. | C10G 35/09 |
| | | | | | | 502/174 |
| 4,298,504 | A | * | 11/1981 | Antos | .................. | C10G 35/09 |
| | | | | | | 502/174 |
| 4,299,689 | A | * | 11/1981 | Antos | .................. | C10G 35/09 |
| | | | | | | 208/138 |
| 4,312,788 | A | * | 1/1982 | Antos | ................. | B01J 23/6567 |
| | | | | | | 502/174 |
| 4,312,789 | A | * | 1/1982 | Antos | ................. | B01J 23/6567 |
| | | | | | | 502/174 |
| 4,327,240 | A | * | 4/1982 | Antos | ................. | B01J 23/6567 |
| | | | | | | 585/741 |

(56) References Cited

U.S. PATENT DOCUMENTS

| | | | | |
|---|---|---|---|---|
| 4,328,385 | A * | 5/1982 | Antos | B01J 23/6567 |
| | | | | 585/253 |
| 4,333,856 | A * | 6/1982 | Antos | B01J 23/6567 |
| | | | | 502/230 |
| 5,080,778 | A * | 1/1992 | Lambert | B01J 21/12 |
| | | | | 208/111.01 |
| 5,102,848 | A * | 4/1992 | Soo | B01J 23/682 |
| | | | | 502/218 |
| 5,139,648 | A * | 8/1992 | Lambert | B01J 21/12 |
| | | | | 208/111.01 |
| 6,518,219 | B1 * | 2/2003 | Yang | B01J 23/85 |
| | | | | 502/314 |
| 7,179,442 | B2 * | 2/2007 | Hagemeyer | C01B 3/16 |
| | | | | 423/655 |
| 7,235,705 | B2 * | 6/2007 | Stell | C10G 9/20 |
| | | | | 585/647 |
| 9,035,094 | B2 * | 5/2015 | Dias | B01J 23/42 |
| | | | | 562/590 |
| 9,468,908 | B2 * | 10/2016 | Salem | B01J 21/066 |
| 2008/0227627 | A1 * | 9/2008 | Strehlau | B01J 29/064 |
| | | | | 502/61 |

* cited by examiner

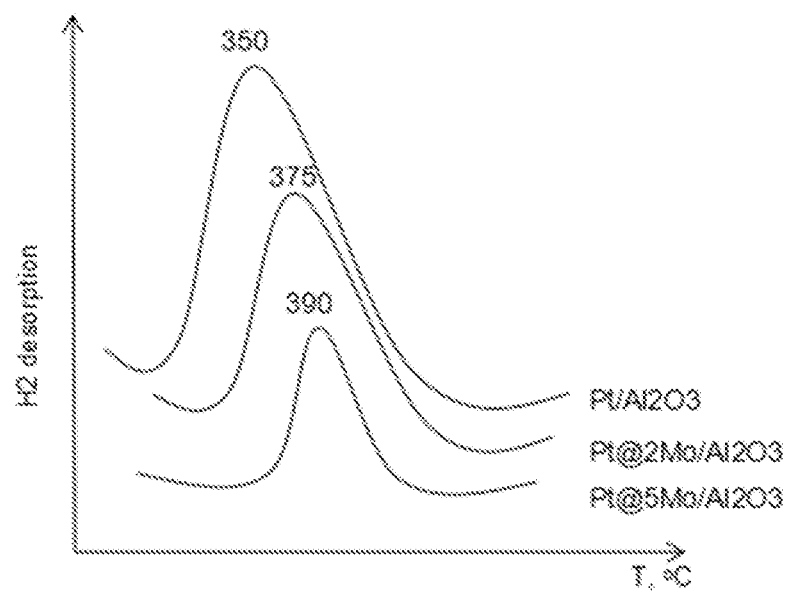

US 11,065,604 B2

CATALYST FOR PRODUCING LIGHT AROMATICS WITH HEAVY AROMATICS, METHOD FOR PREPARING THE CATALYST, AND USE THEREOF

CROSS REFERENCE TO RELATED APPLICATIONS

The present application claims the benefit of the following Chinese patent applications:
1. CN201710709584.3, entitled "catalyst for conversion of polycyclic aromatics to light ones";
2. CN201710709585.8, entitled "high efficiency catalyst for heavy aromatics";
3. CN201710709601.3, entitled "catalyst for producing light aromatics with polycyclic aromatics by hydrogenation saturation";
4. CN201710709602.8, entitled "catalyst for conversion of heavy aromatics to light ones";
5. CN201710709603.2, entitled "catalyst of light aromatics for increasing production";
6. CN201710709605.1, entitled "catalyst for producing monocyclic aromatics with polycyclic aromatics by selective hydrogenation";
7. CN201710709607.0, entitled "catalyst for conversion of polycyclic aromatics to light ones";
8. CN201710709612.1, entitled "polycyclic compound selective catalyst";
9. CN201710709613.6, entitled "polycyclic aromatics selective catalyst";
10. CN201710709621.0, entitled "polycyclic aromatics high efficiency selective catalyst"; and
11. CN201710709622.5, entitled "polycyclic aromatics selective catalyst", all of which as a filing date of on Aug. 18, 2017, the entireties of which are incorporated herein by reference.

FIELD OF THE INVENTION

The present disclosure relates to a catalyst for producing light aromatics with heavy aromatics, a method for preparing the catalyst, and use thereof.

BACKGROUND OF THE INVENTION

Polycyclic aromatics refer to aromatic components with bicyclic and polycyclic structures, and exist in a large amount in catalytic cracking and production processes of ethylene tar and paraxylene (PX). For example, an annual production of catalytic cracking light cycle oil has exceeded 10 million tons, most of which is used as diesel blending component. With continuous increase of demand for PX in China in recent years, PX is in short supply. Thus, large-scale production of aromatics complex and diversification of raw materials become two key points to solve this problem. Therefore, it has a great significance to produce light aromatics by using polycyclic aromatics which are by-products of aromatic complex plants, and to research the production of light aromatics with polycyclic aromatics which are by-products of oil refining device.

From the perspective of reaction process, one of the key steps to realize conversion of polycyclic aromatics to monocyclic aromatics is to realize selective hydrogenation of polycyclic aromatics so as to produce monocyclic aromatics by partial hydrogenation of polycyclic aromatics. In a coexistence system of monocyclic aromatics and polycyclic aromatics, it is an important process to realize selective hydrogenation of aromatics so as to improve the yield of monocyclic aromatics. During the production of monocyclic aromatics, the hydrogenation saturation of monocyclic aromatics such as benzene and toluene is controlled. Metals Pt, Pd and non-precious metals Mo, Ni has been reported to be used in hydrogenation saturation of polycyclic aromatics.

CN104117386A discloses a catalyst used for hydrogenation ring-opening of polycyclic aromatics. The catalyst comprises 5% to 100% of Beta molecular sieve components, and 0.1% to 3% of precious metal selected from Pt, Ir, and Pd loaded thereinto.

CN102688770A discloses an aromatics catalyst. The catalyst comprises mesoporous zeolite and a precious metal, and the hydrodearomatization activity and sulfur resistance of the catalyst can be improved.

CN103666553A discloses a method for hydroconversion of polycyclic aromatics. First, polycyclic aromatics are at least partially saturated in a hydrogenation reaction zone to obtain polycyclic aromatics conversion ratio of 40% or above, and monocyclic aromatics yield of 4-80%. Then, after reaction in a hydrocracking reaction zone, polycyclic aromatics conversion ratio of 85% or above, and monocyclic aromatics relative yield of 4-30% can be obtained. In this manner, hydrogen consumption during conversion of polycyclic aromatics can be reduced.

SUMMARY OF THE INVENTION

The present disclosure aims to solve the technical problem of low heavy aromatics hydrogenation selectivity and low light aromatics yield in the method of producing light aromatics with heavy aromatics in the prior art.

In a first aspect, the present disclosure provides a catalyst for producing light aromatics with heavy aromatics, and the catalyst comprises a carrier, component (1), and component (2), wherein component (1) comprises one metal element or more metal elements selected from a group consisting of Pt, Pd, Ir, and Rh, and component (2) comprises one metal element or more metal elements selected from a group consisting of IA group, IIA group, IIIA group, IVA group, IB group, IIB group, IIIB group, IVB group, VB group, VIB group, VIIB group, La group, and VIII group other than Pt, Pd, Ir, and Rh.

According to the present disclosure, the metal element of component (1) can exist in the catalyst in elementary form and/or compound form such as oxide.

According to the present disclosure, the metal element of component (2) can exist in the catalyst in elementary form and/or compound form such as oxide.

According to one embodiment of the catalyst, the catalyst has a hydrogen desorption temperature higher than 350° C., preferably higher than 360° C., more preferably higher than 370° C., further preferably higher than 380° C., even further preferably higher than 390° C., most preferably higher than 400° C.

According to one embodiment of the catalyst, component (2) is distributed on a surface of the carrier.

According to one embodiment of the catalyst, component (1) is partially or totally distributed on a surface of component (2). Preferably, component (1) exists in elementary form, and component (2) exists in oxide form.

According to one embodiment of the catalyst, component (1) comprises Pt and Pd, preferably, a weight ratio of Pt to Pd is in a range of (0.1-10):1, preferably (0.1-8):1, more preferably (0.1-5):1. The combination of Pt and Pd has a synergistic effect on improving selective hydrogenation activity of polycyclic compounds.

According to one embodiment of the catalyst, component (2) comprises one metal element or more metal elements selected from a group consisting of Re, Mo, W, Mn, Zn, Cu, Cd, Ag, Ni, Co, Fe, Li, K, Mg, Ca, Sr, La, Ce, Pr, Ga, Ge, Sn, Ti, V, Zr, Nb, Y, and Sc.

According to one embodiment of the catalyst, component (2) comprises metal elements selected from i) to viii):
 i), at least two of Mo, W, Mn, and Re;
 ii), at least two of Zn, Cu, Ag, and Cd;
 iii), at least two of Co, Ni, and Fe;
 iv), at least two of K, Li, Mg, Ca, and Sr;
 v), at least two of La, Ce, and Pr;
 vi), at least two of Ga, Ge, and Sn;
 vii), at least two of Zr, Nb, V, and Ti; and
 viii), Y and Sc.

According to one preferred embodiment of the catalyst, component (2) comprises one or more selected from a group consisting of a combination of W and Mo, a combination of Mn and Mo, a combination of Re and Mo, a combination of Cu and Zn, a combination of Ag and Zn, a combination of Cd and Zn, a combination of Co and Ni, a combination of Fe and Co, a combination of Fe and Ni, a combination of K and Li, a combination of K and Sr, a combination of K and Mg, a combination of Mg and Sr, a combination of La and Ce, a combination of La and Pr, a combination of Ce and Pr, a combination of Ga and Ge, a combination of Ga and Sn, a combination of Ge and Sn, a combination of Zr and Nb, a combination of Zr and V, a combination of Zr and Ti, a combination of Nb and V, a combination of V and Ti, and a combination of Y and Sc.

According to one embodiment of the catalyst, in the combination of W and Mo, a weight ratio of W to Mo is in a range of (0.1-10):1, preferably (0.2-5):1. In this embodiment, the combination of W and Mo has a synergistic effect on improving selective hydrogenation activity of polycyclic compounds.

According to one embodiment of the catalyst, in the combination of Mn and Mo, a weight ratio of Mn to Mo is in a range of (0.1-10):1, preferably (0.2-5):1. In this embodiment, the combination of Mn and Mo has a synergistic effect on improving selective hydrogenation activity of polycyclic compounds.

According to one embodiment of the catalyst, in the combination of Re and Mo, a weight ratio of Re to Mo is in a range of (0.1-10):1, preferably (0.2-5):1. In this embodiment, the combination of Re and Mo has a synergistic effect on improving selective hydrogenation activity of polycyclic compounds.

According to one embodiment of the catalyst, in the combination of Cu and Zn, a weight ratio of Cu to Zn is in a range of (0.1-10):1, preferably (0.2-5):1. In this embodiment, the combination of Cu and Zn has a synergistic effect on improving selective hydrogenation activity of polycyclic compounds.

According to one embodiment of the catalyst, in the combination of Ag and Zn, a weight ratio of Ag to Zn is in a range of (0.1-10):1, preferably (0.2-5):1. In this embodiment, the combination of Ag and Zn has a synergistic effect on improving selective hydrogenation activity of polycyclic compounds.

According to one embodiment of the catalyst, in the combination of Cd and Zn, a weight ratio of Cd to Zn is in a range of (0.1-10):1, preferably (0.2-5):1. In this embodiment, the combination of Cd and Zn has a synergistic effect on improving selective hydrogenation activity of polycyclic compounds.

According to one embodiment of the catalyst, in the combination of Co and Ni, a weight ratio of Co to Ni is in a range of (0.1-10):1, preferably (0.2-5):1. In this embodiment, the combination of Co and Ni has a synergistic effect on improving selective hydrogenation activity of polycyclic compounds.

According to one embodiment of the catalyst, in the combination of Fe and Co, a weight ratio of Fe to Co is in a range of (0.1-10):1, preferably (0.2-5):1. In this embodiment, the combination of Fe and Co has a synergistic effect on improving selective hydrogenation activity of polycyclic compounds.

According to one embodiment of the catalyst, in the combination of Fe and Ni, a weight ratio of Fe to Ni is in a range of (0.1-10):1, preferably (0.2-5):1. In this embodiment, the combination of Fe and Ni has a synergistic effect on improving selective hydrogenation activity of polycyclic compounds.

According to one embodiment of the catalyst, in the combination of K and Li, a weight ratio of K to Li is in a range of (0.1-10):1, preferably (0.2-5):1. In this embodiment, the combination of K and Li has a synergistic effect on improving selective hydrogenation activity of polycyclic compounds.

According to one embodiment of the catalyst, in the combination of K and Sr, a weight ratio of K to Sr is in a range of (0.1-10):1, preferably (0.2-5):1. In this embodiment, the combination of K and Sr has a synergistic effect on improving selective hydrogenation activity of polycyclic compounds.

According to one embodiment of the catalyst, in the combination of K and Mg, a weight ratio of K to Mg is in a range of (0.1-10):1, preferably (0.2-5):1. In this embodiment, the combination of K and Mg has a synergistic effect on improving selective hydrogenation activity of polycyclic compounds.

According to one embodiment of the catalyst, in the combination of Mg and Sr, a weight ratio of Mg to Sr is in a range of (0.1-10):1, preferably (0.2-5):1. In this embodiment, the combination of Mg and Sr has a synergistic effect on improving selective hydrogenation activity of polycyclic compounds.

According to one embodiment of the catalyst, in the combination of La and Ce, a weight ratio of La to Ce is in a range of (0.1-10):1, preferably (0.2-5):1. In this embodiment, the combination of La and Ce has a synergistic effect on improving selective hydrogenation activity of polycyclic compounds.

According to one embodiment of the catalyst, in the combination of La and Pr, a weight ratio of La to Pr is in a range of (0.1-10):1, preferably (0.2-5):1. In this embodiment, the combination of La and Pr has a synergistic effect on improving selective hydrogenation activity of polycyclic compounds.

According to one embodiment of the catalyst, in the combination of Ce and Pr, a weight ratio of Ce to Pr is in a range of (0.1-10):1, preferably (0.2-5):1. In this embodiment, the combination of Ce and Pr has a synergistic effect on improving selective hydrogenation activity of polycyclic compounds.

According to one embodiment of the catalyst, in the combination of Ga and Ge, a weight ratio of Ga to Ge is in a range of (0.1-10):1, preferably (0.2-5):1. In this embodiment, the combination of Ga and Ge has a synergistic effect on improving selective hydrogenation activity of polycyclic compounds.

According to one embodiment of the catalyst, in the combination of Ga and Sn, a weight ratio of Ga to Sn is in a range of (0.1-10):1, preferably (0.2-5):1. In this embodiment, the combination of Ga and Sn has a synergistic effect on improving selective hydrogenation activity of polycyclic compounds.

According to one embodiment of the catalyst, in the combination of Ge and Sn, a weight ratio of Ge to Sn is in a range of (0.1-10):1, preferably (0.2-5):1. In this embodiment, the combination of Ge and Sn has a synergistic effect on improving selective hydrogenation activity of polycyclic compounds.

According to one embodiment of the catalyst, in the combination of Zr and Nb, a weight ratio of Zr to Nb is in a range of (0.1-10):1, preferably (0.2-5):1. In this embodiment, the combination of Zr and Nb has a synergistic effect on improving selective hydrogenation activity of polycyclic compounds.

According to one embodiment of the catalyst, in the combination of Zr and V, a weight ratio of Zr to V is in a range of (0.1-10):1, preferably (0.2-5):1. In this embodiment, the combination of Zr and V has a synergistic effect on improving selective hydrogenation activity of polycyclic compounds.

According to one embodiment of the catalyst, in the combination of Zr and Ti, a weight ratio of Zr to Ti is in a range of (0.1-10):1, preferably (0.2-5):1. In this embodiment, the combination of Zr and Ti has a synergistic effect on improving selective hydrogenation activity of polycyclic compounds.

According to one embodiment of the catalyst, in the combination of Nb and V, a weight ratio of Nb to V is in a range of (0.1-10):1, preferably (0.2-5):1. In this embodiment, the combination of Nb and V has a synergistic effect on improving selective hydrogenation activity of polycyclic compounds.

According to one embodiment of the catalyst, in the combination of V and Ti, a weight ratio of V to Ti is in a range of (0.1-10):1, preferably (0.2-5):1. In this embodiment, the combination of V and Ti has a synergistic effect on improving selective hydrogenation activity of polycyclic compounds.

According to one embodiment of the catalyst, in the combination of Y and Sc, a weight ratio of Y to Sc is in a range of (0.1-10):1, preferably (0.2-5):1. In this embodiment, the combination of Y and Sc has a synergistic effect on improving selective hydrogenation activity of polycyclic compounds.

According to one embodiment of the catalyst, component (1) accounts for 0.01-5.0 wt %, preferably 0.02-3.0 wt % of the catalyst, and component (2) accounts for 0.01-15 wt %, preferably 0.05-8.0 wt % of the catalyst.

According to one embodiment of the catalyst, a weight ratio of component (1) to component (2) is in a range of (0.1-10):1, preferably (0.2-5):1.

According to one embodiment of the catalyst, the carrier is a non-acidic or weakly acidic porous carrier, preferably, the carrier comprises at least one selected from a group consisting of alumina, amorphous silica-alumina, kaolin, and aluminosilicate.

According to one embodiment of the catalyst, the carrier is an L acid (i.e. Lewis acid) additive modified carrier, preferably, the L acid additive comprises at least one of chloride-containing compounds and fluorine-containing compounds.

According to one embodiment of the catalyst, the L acid additive comprises chloride-containing compounds and fluorine-containing compounds, preferably a weight ratio of the chloride-containing compounds to the fluorine-containing compounds is in a range of (0.1-10):1.

According to one embodiment of the catalyst, the chloride-containing compounds comprise at least one selected from a group consisting of $AlCl_3$, $CuCl_2$, $FeCl_3$, $SnCl_4$, $TiCl_4$, and $SbCl_5$, and the fluorine-containing compounds comprise at least one selected from a group consisting of $BF_3$, $NbF_5$, $SbF_5$, $TaF_5$, and $AsF_5$.

According to one embodiment of the catalyst, the L acid additive comprises $AlCl_3$ and $NbF_5$.

According to one embodiment of the catalyst, the L acid additive accounts for 0.01-20 wt %, preferably 0.05-15 wt %, more preferably 0.1-10 wt % of the catalyst.

According to the present disclosure, based on the mutual effect of metals of component (1) and component (2), an electronic feature of the metal of component (1) can be effectively adjusted so as to adjust adsorption strength of the metal of component (1) to aromatics and improve selective hydrogenation activity of heavy aromatics. When the catalyst is used for the treatment of materials containing monocyclic aromatics and polycyclic aromatics, it has the advantages of high polycyclic aromatics selective hydrogenation ratio and low monocyclic aromatics loss.

In a second aspect, the present disclosure provides a method for preparing the aforesaid catalyst, and the method comprises step A), loading a salt containing component (2) onto a carrier, and performing drying and calcinating to obtain a catalyst precursor; and step B), loading a salt containing component (1) onto the catalyst precursor prepared in step A), and performing drying and calcinating. The content of component (1) distributed on the surface of component (2) can be improved by this method.

In the above embodiment, in step A) and step B), a calcinating temperature ranges from 400° C. to 600° C.

In the above embodiment, in step A), the salt containing component (2) is dissolved in water or an organic solvent, and is loaded into the carrier by precipitation, physical bonding, or dipping.

In the above embodiment, in step B), the salt containing component (1) is dissolved in water or an organic solvent, and is loaded onto the catalyst precursor by precipitation, physical bonding, or dipping.

In the above embodiment, the organic solvent used in step A) and step B) is independently selected from a group consisting of alcohols, ketones and hydrocarbons, such as ethanol, acetone, cyclohexane, n-heptane, and toluene.

In a third aspect, the present disclosure further provides a method for producing light aromatics with heavy aromatics, comprising subjecting raw materials containing heavy aromatics to hydrogenation reaction in the presence of the catalyst provided by the first aspect of the present disclosure.

According to one embodiment of the method, a reaction temperature of the hydrogenation reaction is in a range of 100-500° C., preferably 200-400° C.

According to one embodiment of the method, a pressure of the hydrogenation reaction is in a range of 0.5-8.0 MPa, preferably 1.0-7.0 MPa.

According to one embodiment of the method, a molar ratio of hydrogen to heavy aromatics is in a range of 1-10.

According to one embodiment of the method, a feed weight airspeed is in a range of 0.5-20 $h^{-1}$, preferably 3-15 $h^{-1}$.

According to one embodiment of the method, the heavy aromatics are polycyclic aromatics, preferably the polycyclic aromatics comprise at least one selected from a group consisting of naphthalene, anthracene, phenanthrene, and homologues thereof.

BRIEF DESCRIPTION OF THE DRAWINGS

FIG. 1 shows $H_2$-TPD diagram of the catalyst Pt/$Al_2O_3$ prepared in Comparative Example 1A, the catalyst Pt@2Mo/$Al_2O_3$ prepared in Example 1A, and the catalyst Pt@5Mo/Al2O3 prepared in Example 2A. As shown in FIG. 1, with the introduction of Mo, a hydrogen desorption temperature increases, and a hydrogen desorption peak area decreases, which shows that Mo can improve hydrogen adsorption strength of Pt and reduce hydrogen adsorption amount. In this manner, monocyclic aromatics hydrogenation activity can be reduced, and polycyclic aromatics hydrogenation selectivity can be improved.

DETAILED DESCRIPTION OF THE EMBODIMENTS

The present disclosure will be illustrated in detail hereinafter with reference to specific examples, but the present disclosure is not limited to the following examples.

A hydrogen desorption temperature was measured under the following condition. A catalyst was pre-reduced at 450° C. and under normal pressure hydrogen, and then cooled to 50° C. Next, the pre-reduced catalyst was performed hydrogen absorbing under normal pressure to equilibrium. Helium (He) was fed thereinto as purge gas under normal pressure, and a temperature thereof was raised to 600° C. (with a temperature rising rate of 8° C./min). The purge gas was detected by a thermal conductivity detector, and a temperature corresponding to a highest value of a thermal conductivity signal was the hydrogen desorption temperature.

Example 1A

Alumina ball carrier (20 g) was impregnated with ammonium molybdate solution of a volume equal to the pore volume of the carrier (i.e. equivalent-volume impregnation), then dried for 4 hours at 120° C. and calcinated for 4 hours at 550° C. to obtain catalyst A1 with Mo content of 2% (wt). The catalyst A1 was impregnated with chloroplatinic acid solution of a volume equal to the pore volume of the carrier to obtain catalyst B1 with Pt content of 0.2% (wt).

Example 2A

Alumina ball carrier (20 g) was impregnated with ammonium molybdate solution of a volume equal to the pore volume of the carrier, then dried for 4 hours at 120° C. and calcinated for 4 hours at 550° C. to obtain catalyst A2 with Mo content of 5% (wt). The catalyst A2 was impregnated with chloroplatinic acid solution of a volume equal to the pore volume of the carrier to obtain catalyst B2 with Pt content of 0.2% (wt).

Example 3A

Alumina ball carrier (20 g) was impregnated with ammonium molybdate solution of a volume equal to the pore volume of the carrier, then dried for 4 hours at 120° C. and calcinated for 4 hours at 550° C. to obtain catalyst A3 with Mo content of 2% (wt). The catalyst A3 was impregnated with chloroplatinic acid solution of a volume equal to the pore volume of the carrier to obtain catalyst B3 with Pt content of 0.5% (wt).

Example 4A

Alumina ball carrier (20 g) was impregnated with ammonium molybdate solution of a volume equal to the pore volume of the carrier, then dried for 4 hours at 120° C. and calcinated for 4 hours at 550° C. to obtain catalyst A4 with Mo content of 2% (wt). The catalyst A4 was impregnated with chloropalladium acid solution of a volume equal to the pore volume of the carrier to obtain catalyst B4 with Pd content of 0.2% (wt).

Example 5A

Alumina ball carrier (20 g) was impregnated with ammonium molybdate solution of a volume equal to the pore volume of the carrier, then dried for 4 hours at 120° C. and calcinated for 4 hours at 550° C. to obtain catalyst A5 with Mo content of 2% (wt). The catalyst A5 was impregnated with chloroiridic acid solution of a volume equal to the pore volume of the carrier to obtain catalyst B5 with Ir content of 0.2% (wt).

Example 6A

Alumina ball carrier (20 g) was impregnated with ammonium tungstate solution of a volume equal to the pore volume of the carrier, then dried for 4 hours at 120° C. and calcinated for 4 hours at 550° C. to obtain catalyst A6 with W content of 2% (wt). The catalyst A6 was impregnated with chloroplatinic acid solution of a volume equal to the pore volume of the carrier to obtain catalyst B6 with Pt content of 0.2% (wt).

Example 7A

Alumina ball carrier (20 g) was impregnated with manganese dichloride solution of a volume equal to the pore volume of the carrier, then dried for 4 hours at 120° C. and calcinated for 4 hours at 550° C. to obtain catalyst A7 with Mn content of 2% (wt). The catalyst A7 was impregnated with chloroplatinic acid solution of a volume equal to the pore volume of the carrier to obtain catalyst B7 with Pt content of 0.2% (wt).

Example 8A

Alumina ball carrier (20 g) was impregnated with perrhenic acid solution of a volume equal to the pore volume of the carrier, then dried for 4 hours at 120° C. and calcinated for 4 hours at 550° C. to obtain catalyst A8 with Re content of 2% (wt). The catalyst A8 was impregnated with chloroplatinic acid solution of a volume equal to the pore volume of the carrier to obtain catalyst B8 with Pt content of 0.2% (wt).

Example 9A

Alumina ball carrier (20 g) was impregnated with ammonium molybdate solution and ammonium tungstate solution of a volume equal to the pore volume of the carrier, then dried for 4 hours at 120° C. and calcinated for 4 hours at 550° C. to obtain catalyst A9 with Mo content of 1% (wt) and W content of 1% (wt). The catalyst A9 was impregnated with chloroplatinic acid solution and palladium chloride solution of a volume equal to the pore volume of the carrier to obtain catalyst B9 with Pt content of 0.1% (wt) and Pd content of 0.1% (wt).

Example 10A

Alumina ball carrier (20 g) was impregnated with ammonium molybdate solution and manganese chloride solution of a volume equal to the pore volume of the carrier, then dried for 4 hours at 120° C. and calcinated for 4 hours at 550° C. to obtain catalyst A10 with Mo content of 1% (wt) and Mn content of 1% (wt). The catalyst A10 was impregnated with chloroplatinic acid solution and palladium chloride solution of a volume equal to the pore volume of the carrier to obtain catalyst B10 with Pt content of 0.1% (wt) and Pd content of 0.1% (wt).

Example 11A

Alumina ball carrier (20 g) was impregnated with ammonium molybdate solution and perrhenic acid solution of a volume equal to the pore volume of the carrier, then dried for 4 hours at 120° C. and calcinated for 4 hours at 550° C. to obtain catalyst A11 with Mo content of 1% (wt) and Re content of 1% (wt). The catalyst A11 was impregnated with chloroplatinic acid solution and palladium chloride solution of a volume equal to the pore volume of the carrier to obtain catalyst B11 with Pt content of 0.1% (wt) and Pd content of 0.1% (wt).

Example 12A

Alumina ball carrier (20 g) was impregnated with ammonium tungstate solution and perrhenic acid solution of a volume equal to the pore volume of the carrier, then dried for 4 hours at 120° C. and calcinated for 4 hours at 550° C. to obtain catalyst A12 with W content of 1% (wt) and Re content of 1% (wt). The catalyst A12 was impregnated with chloroplatinic acid solution and palladium chloride solution of a volume equal to the pore volume of the carrier to obtain catalyst B12 with Pt content of 0.1% (wt) and Pd content of 0.1% (wt).

Example 13A

Alumina ball carrier (20 g) was impregnated with ammonium tungstate solution and ammonium molybdate solution of a volume equal to the pore volume of the carrier, then dried for 4 hours at 120° C. and calcinated for 4 hours at 550° C. to obtain catalyst A13 with W content of 1% (wt) and Mo content of 1% (wt). The catalyst A13 was impregnated with chloroplatinic acid solution and iridium trichloride solution of a volume equal to the pore volume of the carrier to obtain catalyst B13 with Pt content of 0.1% (wt) and Ir content of 0.1% (wt).

Example 14A

Amorphous silica-alumina ball carrier (20 g) was impregnated with ammonium tungstate solution and ammonium molybdate solution of a volume equal to the pore volume of the carrier, then dried for 4 hours at 120° C. and calcinated for 4 hours at 550° C. to obtain catalyst A14 with W content of 1% (wt) and Mo content of 1% (wt). The catalyst A14 was impregnated with chloroplatinic acid solution and palladium chloride solution of a volume equal to the pore volume of the carrier to obtain catalyst B14 with Pt content of 0.1% (wt) and Pd content of 0.1% (wt).

Example 15A

Shaped carrier of high silicon Y molecular sieve and alumina (20 g) was impregnated with ammonium tungstate solution and ammonium molybdate solution of a volume equal to the pore volume of the carrier, then dried for 4 hours at 120° C. and calcinated for 4 hours at 550° C. to obtain catalyst A15 with W content of 1% (wt) and Mo content of 1% (wt). The catalyst A15 was impregnated with chloroplatinic acid solution and palladium chloride solution of a volume equal to the pore volume of the carrier to obtain catalyst B15 with Pt content of 0.1% (wt) and Pd content of 0.1% (wt).

Example 16A

Alumina shaped carrier (20 g) was impregnated with ammonium tungstate solution and ammonium molybdate solution of a volume equal to the pore volume of the carrier, then dried for 4 hours at 120° C. and calcinated for 4 hours at 550° C. to obtain catalyst A16 with Mo content of 0.5% (wt) and W content of 1.5% (wt). The catalyst A16 was impregnated with chloroplatinic acid solution and palladium chloride solution of a volume equal to the pore volume of the carrier to obtain catalyst B16 with Pt content of 0.1% (wt) and Pd content of 0.1% (wt).

Example 17A

Alumina shaped carrier (20 g) was impregnated with ammonium tungstate solution and ammonium molybdate solution of a volume equal to the pore volume of the carrier, then dried for 4 hours at 120° C. and calcinated for 4 hours at 550° C. to obtain catalyst A17 with Mo content of 1.5% (wt) and W content of 0.5% (wt). The catalyst A17 was impregnated with chloroplatinic acid solution and palladium chloride solution of a volume equal to the pore volume of the carrier to obtain catalyst B17 with Pt content of 0.1% (wt) and Pd content of 0.1% (wt).

Example 18A

Alumina shaped carrier (20 g) was impregnated with ammonium tungstate solution and ammonium molybdate solution of a volume equal to the pore volume of the carrier, then dried for 4 hours at 120° C. and calcinated for 4 hours at 550° C. to obtain catalyst A18 with Mo content of 1% (wt) and W content of 1% (wt). The catalyst A18 was impregnated with chloroplatinic acid solution and palladium chloride solution of a volume equal to the pore volume of the carrier to obtain catalyst B18 with Pt content of 0.03% (wt) and Pd content of 0.17% (wt).

Example 19A

Alumina shaped carrier (20 g) was impregnated with ammonium tungstate solution and ammonium molybdate solution of a volume equal to the pore volume of the carrier, then dried for 4 hours at 120° C. and calcinated for 4 hours at 550° C. to obtain catalyst A19 with Mo content of 1% (wt) and W content of 1% (wt). The catalyst A19 was impregnated with chloroplatinic acid solution and palladium chloride solution of a volume equal to the pore volume of the carrier to obtain catalyst B19 with Pt content of 0.17% (wt) and Pd content of 0.03% (wt).

Example 20A

Alumina ball carrier (20 g) was impregnated with chloroplatinic acid solution, palladium chloride solution, ammonium molybdate solution, and ammonium tungstate solution of a volume equal to the pore volume of the carrier, then dried for 4 hours at 120° C. and calcinated for 4 hours at 550° C. to obtain catalyst B20 with Pt content of 0.1% (wt), Pd content of 0.1% (wt), Mo content of 1% (wt), and W content of 1% (wt).

Example 21A

Alumina ball carrier (20 g) was impregnated with a certain amount of $AlCl_3$ solution and was calcinated for 3 hours at 500° C. to obtain modified alumina I with $AlCl_3$ content of 5% (wt). The modified alumina I was impregnated with ammonium molybdate solution and ammonium tungstate solution of a volume equal to the pore volume of the modified alumina I, then dried for 4 hours at 120° C. and calcinated for 4 hours at 550° C. to obtain catalyst A21 with Mo content of 1% (wt) and W content of 1% (wt). The catalyst A21 was impregnated with chloroplatinic acid solution and palladium chloride solution of a volume equal to the pore volume of the carrier to obtain catalyst B21 with Pt content of 0.1% (wt) and Pd content of 0.1% (wt).

Example 22A

Alumina ball carrier (20 g) was loaded with a certain amount of $NbF_5$ solution and was calcinated for 3 hours at 500° C. to obtain modified alumina II with $NbF_5$ content of 5% (wt). The modified alumina II was impregnated with ammonium molybdate solution and ammonium tungstate solution of a volume equal to the pore volume of the modified alumina II, then dried for 4 hours at 120° C. and calcinated for 4 hours at 550° C. to obtain catalyst A22 with Mo content of 1% (wt) and W content of 1% (wt). The catalyst A22 was impregnated with chloroplatinic acid solution and palladium chloride solution of a volume equal to the pore volume of the carrier to obtain catalyst B22 with Pt content of 0.1% (wt) and Pd content of 0.1% (wt).

Example 23A

Alumina ball carrier (20 g) was impregnated with a certain amount of $AlCl_3$ solution and $NbF_5$ solution and was calcinated for 3 hours at 500° C. to obtain modified alumina III with $AlCl_3$ content of 2% (wt) and $NbF_5$ content of 3% (wt). The modified alumina III was impregnated with ammonium molybdate solution and ammonium tungstate solution of a volume equal to the pore volume of the modified alumina III, then dried for 4 hours at 120° C. and calcinated for 4 hours at 550° C. to obtain catalyst A23 with Mo content of 1% (wt) and W content of 1% (wt). The catalyst A23 was impregnated with chloroplatinic acid solution and palladium chloride solution of a volume equal to the pore volume of the carrier to obtain catalyst B23 with Pt content of 0.1% (wt) and Pd content of 0.1% (wt).

Example 24A

Alumina ball carrier (20 g) was impregnated with ammonium molybdate solution and ammonium tungstate solution of a volume equal to the pore volume of the carrier, then dried for 4 hours at 120° C. and calcinated for 4 hours at 550° C. to obtain catalyst A24 with Mo content of 1% (wt) and W content of 1% (wt). The catalyst A24 was impregnated with chloroplatinic acid solution and palladium chloride solution of a volume equal to the pore volume of the carrier to obtain catalyst B24 with Pt content of 0.1% (wt) and Pd content of 0.1% (wt). The catalyst B24 was impregnated with a certain amount of $AlCl_3$ solution and $NbF_5$ solution and was calcinated for 3 hours at 500° C. to obtain catalyst B24a with $AlCl_3$ content of 2% (wt) and $NbF_5$ content of 3% (wt).

Example 25A

Alumina ball carrier (20 g) was impregnated with chloroplatinic acid solution and palladium chloride solution of a volume equal to the pore volume of the carrier, then dried for 4 hours at 120° C. and calcinated for 4 hours at 500° C. to obtain catalyst A25 with Pt content of 0.1% (wt) and Pd content of 0.1% (wt). The catalyst A25 was impregnated with ammonium molybdate solution and ammonium tungstate solution to obtain catalyst B25 with Mo content of 1% (wt) and W content of 1% (wt).

Comparative Example 1A

Alumina ball carrier (20 g) was impregnated with chloroplatinic acid solution of a volume equal to the pore volume of the carrier to obtain catalyst B26 with Pt content of 0.2% (wt).

Comparative Example 2A

Alumina ball carrier (20 g) was impregnated with chloroplatinic acid solution and palladium chloride solution of a volume equal to the pore volume of the carrier to obtain catalyst B27 with Pt content of 0.1% (wt) and Pd content of 0.1% (wt).

Comparative Example 3A

Alumina ball carrier (20 g) was impregnated with ammonium molybdate solution and ammonium tungstate solution of a volume equal to the pore volume of the carrier to obtain catalyst B28 with Mo content of 1% (wt) and W content of 1% (wt).

The catalysts prepared in Examples 1A to 25A and Comparative Examples 1A to 3A are evaluated by the following method. Catalyst (5 g) was placed in a reactor, and hydrogen was fed therein. Reduction reaction was performed for 3 hours at 450° C., and then a temperature thereof was reduced to 350° C. Hydrogen and materials containing toluene and naphthalene are fed therein and contact with the catalyst, and reaction activity was measured. Reaction conditions: a total weight airspeed was 10 $h^{-1}$; a reaction temperature was 350° C.; a reaction pressure was 3.0 MPa; and a molecular ratio of hydrogen to hydrocarbon was 3.0. In raw materials, toluene:naphthalene=95:5 (wt). The reaction performances are shown in Table 1, wherein R2/R1 represents a ratio of naphthalene hydrogenation ratio to toluene hydrogenation ratio, and reflects hydrogenation selectivity of each catalyst for polycyclic aromatics.

TABLE 1

| Examples | Component (2)/content (wt %) | Component (1)/content (wt %) | Hydrogen desorption temperature (° C.) | Toluene hydrogenation ratio (R1) wt % | Naphthalene hydrogenation ratio (R2) wt % | R2/R1 |
|---|---|---|---|---|---|---|
| 1A | Mo/2.0 | Pt/0.2 | 375 | 1.9 | 53.7 | 28.3 |
| 2A | Mo/5.0 | Pt/0.2 | 390 | 1.2 | 49.9 | 41.6 |
| 3A | Mo/2.0 | Pt/0.5 | 361 | 3.9 | 59.9 | 15.4 |
| 4A | Mo/2.0 | Pd/0.2 | 382 | 1.1 | 51.8 | 47.1 |
| 5A | Mo/2.0 | Ir/0.2 | 380 | 1.1 | 48.5 | 44.1 |
| 6A | W/2.0 | Pt/0.2 | 371 | 2.5 | 55.7 | 22.3 |
| 7A | Mn/2.0 | Pt/0.2 | 373 | 2.0 | 53.9 | 27.0 |
| 8A | Re/2.0 | Pt/0.2 | 361 | 2.9 | 54.1 | 18.7 |
| 9A | Mo/1.0-W/1.0 | Pt/0.1-Pd/0.1 | 405 | 1.1 | 62.1 | 56.5 |
| 10A | Mo/1.0-Mn/1.0 | Pt/0.1-Pd/0.1 | 377 | 1.5 | 57.8 | 38.5 |
| 11A | Mo/1.0-Re/1.0 | Pt/0.1-Pd/0.1 | 375 | 1.9 | 59.2 | 31.2 |
| 12A | W/1-Re/1.0 | Pt/0.1-Pd/0.1 | 369 | 2.1 | 61.8 | 29.4 |
| 13A | Mo/1.0-W/1.0 | Pt/0.1-Ir/0.1 | 383 | 1.2 | 55.9 | 46.6 |
| 14A | Mo/1.0-W/1.0 | Pt/0.1-Pd/0.1 | 381 | 1.5 | 61.8 | 41.2 |
| 15A | Mo/1.0-W/1.0 | Pt/0.1-Pd/0.1 | 378 | 2.8 | 63.1 | 22.5 |
| 16A | Mo/0.5-W/1.5 | Pt/0.1-Pd/0.1 | 395 | 1.2 | 62.9 | 52.4 |
| 17A | Mo/1.5-W/0.5 | Pt/0.1-Pd/0.1 | 403 | 1.0 | 58.3 | 58.3 |
| 18A | Mo/1.0-W/1.0 | Pt/0.03-Pd/0.17 | 401 | 0.9 | 52.2 | 58.0 |
| 19A | Mo/1.0-W/1.0 | Pt/0.17-Pd/0.03 | 377 | 2.1 | 63.2 | 30.1 |
| 20A | Mo/1.0-W/1.0 | Pt/0.1-Pd/0.1 | 385 | 1.5 | 60.9 | 40.6 |
| 21A | Mo/1.0-W/1.0 | Pt/0.1-Pd/0.1 | 391 | 1.2 | 66.3 | 55.3 |
| 22A | Mo/1.0-W/1.0 | Pt/0.1-Pd/0.1 | 389 | 1.2 | 65.7 | 54.8 |
| 23A | Mo/1.0-W/1.0 | Pt/0.1-Pd/0.1 | 398 | 1.1 | 68.9 | 62.6 |
| 24A | Mo/1.0-W/1.0 | Pt/0.1-Pd/0.1 | 401 | 1.1 | 64.0 | 58.2 |
| 25A | Mo/1.0-W/1.0 | Pt/0.1-Pd/0.1 | 365 | 3.5 | 55.0 | 15.7 |
| Comparative Example 1A | / | Pt/0.2 | 350 | 33.6 | 59.3 | 1.8 |
| Comparative Example 2A | | Pt/0.1-Pd/0.1 | 360 | 7.3 | 58.9 | 8.1 |
| Comparative Example 3A | Mo/1.0-W/1.0 | | 330 | 0.8 | 8.9 | 11.1 |

Example 1B

Alumina ball carrier (20 g) was impregnated with zinc nitrate solution of a volume equal to the pore volume of the carrier, then dried for 4 hours at 120° C. and calcinated for 4 hours at 550° C. to obtain catalyst A1 with Zn content of 5% (wt). The catalyst A1 was impregnated with chloroplatinic acid solution of a volume equal to the pore volume of the carrier to obtain catalyst B1 with Pt content of 0.3% (wt).

Example 2B

Alumina ball carrier (20 g) was impregnated with copper nitrate solution of a volume equal to the pore volume of the carrier, then dried for 4 hours at 120° C. and calcinated for 4 hours at 550° C. to obtain catalyst A2 with Cu content of 5% (wt). The catalyst A2 was impregnated with chloroplatinic acid solution of a volume equal to the pore volume of the carrier to obtain catalyst B2 with Pt content of 0.3% (wt).

Example 3B

Alumina ball carrier (20 g) was impregnated with zinc nitrate solution of a volume equal to the pore volume of the carrier, then dried for 4 hours at 120° C. and calcinated for 4 hours at 550° C. to obtain catalyst A3 with Zn content of 2% (wt). The catalyst A3 was impregnated with chloroplatinic acid solution of a volume equal to the pore volume of the carrier to obtain catalyst B3 with Pt content of 0.3% (wt).

Example 4B

Alumina ball carrier (20 g) was impregnated with zinc nitrate solution of a volume equal to the pore volume of the carrier, then dried for 4 hours at 120° C. and calcinated for 4 hours at 550° C. to obtain catalyst A4 with Zn content of 5% (wt). The catalyst A4 was impregnated with chloropalladium acid solution of a volume equal to the pore volume of the carrier to obtain catalyst B4 with Pd content of 0.3% (wt).

Example 5B

Alumina ball carrier (20 g) was impregnated with zinc nitrate solution of a volume equal to the pore volume of the carrier, then dried for 4 hours at 120° C. and calcinated for 4 hours at 550° C. to obtain catalyst A5 with Zn content of 5% (wt). The catalyst A5 was impregnated with chloroiridic acid aqueous solution of a volume equal to the pore volume of the carrier to obtain catalyst B5 with Ir content of 0.3% (wt).

Example 6B

Alumina ball carrier (20 g) was impregnated with silver nitrate solution of a volume equal to the pore volume of the carrier, then dried for 4 hours at 120° C. and calcinated for 4 hours at 550° C. to obtain catalyst A6 with Ag content of 5% (wt). The catalyst A6 was impregnated with chloroplatinic acid ethanol solution of a volume equal to the pore volume of the carrier to obtain catalyst B6 with Pt content of 0.3% (wt).

Example 7B

Alumina ball carrier (20 g) was impregnated with cadmium nitrate solution of a volume equal to the pore volume of the carrier, then dried for 4 hours at 120° C. and calcinated for 4 hours at 550° C. to obtain catalyst A7 with Cd content of 5% (wt). The catalyst A7 was impregnated with chloroplatinic acid solution of a volume equal to the pore volume of the carrier to obtain catalyst B7 with Pt content of 0.3% (wt).

Example 8B

Alumina ball carrier (20 g) was impregnated with zinc nitrate solution and copper nitrate solution of a volume equal to the pore volume of the carrier, then dried for 4 hours at 120° C. and calcinated for 4 hours at 550° C. to obtain catalyst A8 with Zn content of 2% (wt) and Cu content of 3% (wt). The catalyst A8 was impregnated with chloroplatinic acid solution of a volume equal to the pore volume of the carrier to obtain catalyst B8 with Pt content of 0.3% (wt).

Example 9B

Alumina ball carrier (20 g) was impregnated with zinc nitrate solution and copper nitrate solution of a volume equal to the pore volume of the carrier, then dried for 4 hours at 120° C. and calcinated for 4 hours at 550° C. to obtain catalyst A9 with Zn content of 2% (wt) and Cu content of 3% (wt). The catalyst A9 was impregnated with chloroplatinic acid solution and palladium chloride solution of a volume equal to the pore volume of the carrier to obtain catalyst B9 with Pt content of 0.1% (wt) and Pd content of 0.2% (wt).

Example 10B

Alumina ball carrier (20 g) was impregnated with zinc nitrate solution and copper nitrate solution of a volume equal to the pore volume of the carrier, then dried for 4 hours at 120° C. and calcinated for 4 hours at 550° C. to obtain catalyst A10 with Zn content of 2% (wt) and Cu content of 3% (wt). The catalyst A10 was impregnated with chloroplatinic acid solution and chloroiridic acid solution of a volume equal to the pore volume of the carrier to obtain catalyst B10 with Pt content of 0.1% (wt) and Ir content of 0.2% (wt).

Example 11B

Alumina ball carrier (20 g) was impregnated with zinc nitrate solution and copper nitrate solution of a volume equal to the pore volume of the carrier, then dried for 4 hours at 120° C. and calcinated for 4 hours at 550° C. to obtain catalyst A11 with Zn content of 2% (wt) and Cu content of 3% (wt). The catalyst A11 was impregnated with chloroplatinic acid solution and palladium chloride solution of a volume equal to the pore volume of the carrier to obtain catalyst B11 with Pt content of 0.05% (wt) and Pd content of 0.25% (wt).

Example 12B

Alumina ball carrier (20 g) was impregnated with zinc nitrate solution and copper nitrate solution of a volume equal to the pore volume of the carrier, then dried for 4 hours at 120° C. and calcinated for 4 hours at 550° C. to obtain catalyst A12 with Zn content of 2% (wt) and Cu content of 3% (wt). The catalyst A12 was impregnated with chloroplatinic acid solution and palladium chloride solution of a volume equal to the pore volume of the carrier to obtain catalyst B12 with Pt content of 0.2% (wt) and Pd content of 0.1% (wt).

Example 13B

Alumina ball carrier (20 g) was impregnated with zinc nitrate solution and silver nitrate solution of a volume equal to the pore volume of the carrier, then dried for 4 hours at 120° C. and calcinated for 4 hours at 550° C. to obtain catalyst A13 with Zn content of 2% (wt) and Ag content of 3% (wt). The catalyst A13 was impregnated with chloroplatinic acid solution and palladium chloride solution of a volume equal to the pore volume of the carrier to obtain catalyst B13 with Pt content of 0.05% (wt) and Pd content of 0.25% (wt).

Example 14B

Alumina ball carrier (20 g) was impregnated with zinc nitrate solution and cadmium nitrate solution of a volume equal to the pore volume of the carrier, then dried for 4 hours at 120° C. and calcinated for 4 hours at 550° C. to obtain catalyst A14 with Zn content of 2% (wt) and Cd content of 3% (wt). The catalyst A14 was impregnated with chloroplatinic acid solution and palladium chloride solution of a volume equal to the pore volume of the carrier to obtain catalyst B14 with Pt content of 0.05% (wt) and Pd content of 0.25% (wt).

Example 15B

Alumina ball carrier (20 g) was impregnated with copper nitrate solution and cadmium nitrate solution of a volume equal to the pore volume of the carrier, then dried for 4 hours at 120° C. and calcinated for 4 hours at 550° C. to obtain catalyst A15 with Cu content of 2% (wt) and Cd content of 3% (wt). The catalyst A15 was impregnated with chloroplatinic acid solution and palladium chloride solution of a volume equal to the pore volume of the carrier to obtain catalyst B15 with Pt content of 0.05% (wt) and Pd content of 0.25% (wt).

Example 16B

Alumina ball carrier (20 g) was impregnated with copper nitrate solution and silver nitrate solution of a volume equal to the pore volume of the carrier, then dried for 4 hours at 120° C. and calcinated for 4 hours at 550° C. to obtain catalyst A16 with Cu content of 2% (wt) and Ag content of 3% (wt). The catalyst A16 was impregnated with chloroplatinic acid solution and palladium chloride solution of a volume equal to the pore volume of the carrier to obtain catalyst B16 with Pt content of 0.05% (wt) and Pd content of 0.25% (wt).

Example 17B

Amorphous silica-alumina ball carrier (20 g) was impregnated with zinc nitrate solution and copper nitrate solution of a volume equal to the pore volume of the carrier, then dried for 4 hours at 120° C. and calcinated for 4 hours at 550° C. to obtain catalyst A17 with Zn content of 2% (wt) and Cu content of 3% (wt). The catalyst A17 was impregnated with chloroplatinic acid solution and palladium chloride solution of a volume equal to the pore volume of the carrier to obtain catalyst B17 with Pt content of 0.05% (wt) and Pd content of 0.25% (wt).

Example 18B

Carrier made of dealuminized mordenite (Si/Al=100) and alumina (20 g) was impregnated with zinc nitrate solution and copper nitrate solution of a volume equal to the pore volume of the carrier, then dried for 4 hours at 120° C. and calcinated for 4 hours at 550° C. to obtain catalyst A18 with Zn content of 2% (wt) and Cu content of 3% (wt). The catalyst A18 was impregnated with chloroplatinic acid solution and palladium chloride solution of a volume equal to the pore volume of the carrier to obtain catalyst B18 with Pt content of 0.05% (wt) and Pd content of 0.25% (wt).

Comparative Example 1B

Alumina ball carrier (20 g) was impregnated with chloroplatinic acid solution of a volume equal to the pore volume of the carrier to obtain catalyst B19 with Pt content of 0.3% (wt).

Comparative Example 2B

Alumina ball carrier (20 g) was impregnated with chloroplatinic acid solution and palladium chloride solution of a volume equal to the pore volume of the carrier to obtain catalyst B20 with Pt content of 0.05% (wt) and Pd content of 0.25% (wt).

Comparative Example 3B

Alumina ball carrier (20 g) was impregnated with zinc nitrate solution and copper nitrate solution of a volume equal to the pore volume of the carrier, then dried for 4 hours at 120° C. and calcinated for 4 hours at 550° C. to obtain catalyst B21 with Zn content of 2% (wt) and Cu content of 3% (wt).

The catalysts prepared in Examples 1B to 18B and Comparative Examples 1B to 3B are evaluated by the following method. Catalyst (5 g) was placed in a reactor, and hydrogen was fed therein. Reduction reaction was performed for 3 hours at 450° C., and then a temperature thereof was reduced to 350° C. Hydrogen and materials containing toluene and naphthalene are fed therein and contact with the catalyst, and reaction activity was measured. Reaction conditions: a total weight airspeed was 10 h$^{-1}$; a reaction temperature was 350° C.; a reaction pressure was 3.0 MPa; and a molecular ratio of hydrogen to hydrocarbon was 3.0. In raw materials, toluene:naphthalene=90:10 (wt). The reaction performances are shown in Table 2.

TABLE 2

| Examples | Component (2)/content (wt %) | Component (1)/content (wt %) | Hydrogen desorption temperature (° C.) | Toluene hydrogenation ratio (R1) wt % | Naphthalene hydrogenation ratio (R2) wt % | R2/R1 |
|---|---|---|---|---|---|---|
| 1B | Zn/5.0 | Pt/0.3 | 370 | 2.5 | 55.7 | 22.3 |
| 2B | Cu/5.0 | Pt/0.3 | 375 | 1.8 | 53.6 | 29.8 |
| 3B | Zn/2.0 | Pt/0.3 | 366 | 3.9 | 58.9 | 15.1 |
| 4B | Zn/5.0 | Pd/0.3 | 376 | 1.7 | 51.7 | 30.4 |
| 5B | Zn/5.0 | Ir/0.3 | 375 | 1.6 | 50.4 | 31.5 |
| 6B | Ag/5.0 | Pt/0.3 | 368 | 2.1 | 53.9 | 25.7 |
| 7B | Cd/5.0 | Pt/0.3 | 374 | 1.5 | 46.1 | 30.7 |
| 8B | Zn/2.0-Cu/3.0 | Pt/0.3 | 376 | 1.6 | 57.5 | 35.9 |
| 9B | Zn/2.0-Cu/3.0 | Pt/0.1-Pd/0.2 | 375 | 1.6 | 66.3 | 41.4 |
| 10B | Zn/2.0-Cu/3.0 | Pt/0.1-Ir/0.2 | 373 | 1.5 | 59.3 | 39.5 |
| 11B | Zn/2.0-Cu/3.0 | Pt/0.05-Pd/0.25 | 381 | 1.2 | 65.7 | 54.8 |
| 12B | Zn/2.0-Cu/3.0 | Pt/0.2-Pd/0.1 | 377 | 1.6 | 63.3 | 39.6 |
| 13B | Zn/2.0-Ag/3.0 | Pt/0.05-Pd/0.25 | 388 | 1.2 | 62.5 | 52.1 |
| 14B | Zn/2.0-Cd/3.0 | Pt/0.05-Pd/0.25 | 381 | 1.3 | 61.9 | 47.6 |
| 15B | Cu/2.0-Cd/3.0 | Pt/0.05-Pd/0.25 | 376 | 1.5 | 64.8 | 43.2 |
| 16B | Cu/2.0-Ag/3.0 | Pt/0.05-Pd/0.25 | 376 | 1.4 | 60.6 | 43.3 |
| 17B | Zn/2.0-Cu/3.0 | Pt/0.05-Pd/0.25 | 379 | 1.3 | 66.1 | 50.8 |

TABLE 2-continued

| Examples | Component (2)/content (wt %) | Component (1)/content (wt %) | Hydrogen desorption temperature (° C.) | Toluene hydrogenation ratio (R1) wt % | Naphthalene hydrogenation ratio (R2) wt % | R2/R1 |
|---|---|---|---|---|---|---|
| 18B | Zn/2.0-Cu/3.0 | Pt/0.05-Pd/0.25 | 371 | 1.9 | 66.8 | 35.2 |
| Comparative Example 1B | / | Pt/0.3 | 350 | 38.6 | 53.3 | 1.4 |
| Comparative Example 2B | / | Pt/0.05-Pd/0.25 | 358 | 10.3 | 56.8 | 5.5 |
| Comparative Example 3B | Zn/2.0-Cu/3.0 | / | 316 | 0.7 | 5.2 | 7.4 |

Example 1C

Alumina ball carrier (20 g) was impregnated with nickel nitrate solution of a volume equal to the pore volume of the carrier, then dried for 4 hours at 120° C. and calcinated for 4 hours at 550° C. to obtain catalyst A1 with Ni content of 2% (wt). The catalyst A1 was impregnated with chloroplatinic acid solution of a volume equal to the pore volume of the carrier to obtain catalyst B1 with Pt content of 0.2% (wt).

Example 2C

Alumina ball carrier (20 g) was impregnated with nickel nitrate solution of a volume equal to the pore volume of the carrier, then dried for 4 hours at 120° C. and calcinated for 4 hours at 550° C. to obtain catalyst A2 with Ni content of 5% (wt). The catalyst A2 was impregnated with chloroplatinic acid solution of a volume equal to the pore volume of the carrier to obtain catalyst B2 with Pt content of 0.2% (wt).

Example 3C

Alumina ball carrier (20 g) was impregnated with nickel nitrate solution of a volume equal to the pore volume of the carrier, then dried for 4 hours at 120° C. and calcinated for 4 hours at 550° C. to obtain catalyst A3 with Ni content of 2% (wt). The catalyst A3 was impregnated with chloroplatinic acid solution of a volume equal to the pore volume of the carrier to obtain catalyst B3 with Pt content of 0.5% (wt).

Example 4C

Alumina ball carrier (20 g) was impregnated with nickel nitrate solution of a volume equal to the pore volume of the carrier, then dried for 4 hours at 120° C. and calcinated for 4 hours at 550° C. to obtain catalyst A4 with Ni content of 2% (wt). The catalyst A4 was impregnated with chloropalladium acid solution of a volume equal to the pore volume of the carrier to obtain catalyst B4 with Pd content of 0.2% (wt).

Example 5C

Alumina ball carrier (20 g) was impregnated with nickel nitrate solution of a volume equal to the pore volume of the carrier, then dried for 4 hours at 120° C. and calcinated for 4 hours at 550° C. to obtain catalyst A5 with Ni content of 2% (wt). The catalyst A5 was impregnated with chloroiridic acid solution of a volume equal to the pore volume of the carrier to obtain catalyst B5 with Ir content of 0.2% (wt).

Example 6C

Alumina ball carrier (20 g) was impregnated with nickel nitrate solution of a volume equal to the pore volume of the carrier, then dried for 4 hours at 120° C. and calcinated for 4 hours at 550° C. to obtain catalyst A6 with Ni content of 2% (wt). The catalyst A6 was impregnated with rhodium trichloride solution of a volume equal to the pore volume of the carrier to obtain catalyst B6 with Rh content of 0.2% (wt).

Example 7C

Alumina ball carrier (20 g) was impregnated with ferric nitrate solution of a volume equal to the pore volume of the carrier, then dried for 4 hours at 120° C. and calcinated for 4 hours at 550° C. to obtain catalyst A7 with Fe content of 2% (wt). The catalyst A7 was impregnated with chloroplatinic acid solution of a volume equal to the pore volume of the carrier to obtain catalyst B7 with Pt content of 0.2% (wt).

Example 8C

Alumina ball carrier (20 g) was impregnated with cobalt nitrate solution of a volume equal to the pore volume of the carrier, then dried for 4 hours at 120° C. and calcinated for 4 hours at 550° C. to obtain catalyst A8 with Co content of 2% (wt). The catalyst A8 was impregnated with chloroplatinic acid solution of a volume equal to the pore volume of the carrier to obtain catalyst B8 with Pt content of 0.2% (wt).

Example 9C

Alumina ball carrier (20 g) was impregnated with nickel nitrate solution and ferric nitrate solution of a volume equal to the pore volume of the carrier, then dried for 4 hours at 120° C. and calcinated for 4 hours at 550° C. to obtain catalyst A9 with Ni content of 1% (wt) and Fe content of 1% (wt). The catalyst A9 was impregnated with chloroplatinic acid solution and palladium chloride solution of a volume equal to the pore volume of the carrier to obtain catalyst B9 with Pt content of 0.05% (wt) and Pd content of 0.15% (wt).

Example 10C

Beta molecular sieve (20 g) was impregnated with ferric nitrate solution and cobalt nitrate solution of a volume equal to the pore volume of the carrier, then dried for 4 hours at 120° C. and calcinated for 4 hours at 550° C. to obtain catalyst A10 with Fe content of 1% (wt) and Co content of 1% (wt). The catalyst A1.0 was impregnated with chloroplatinic acid solution and palladium chloride solution of a volume equal to the pore volume of the carrier to obtain catalyst B10 with Pt content of 0.05% (wt) and Pd content of 0.15% (wt).

Example 11C

Beta molecular sieve (20 g) was impregnated with nickel nitrate solution and cobalt nitrate solution of a volume equal to the pore volume of the carrier, then dried for 4 hours at 120° C. and calcinated for 4 hours at 550° C. to obtain catalyst A11 with Ni content of 1% (wt) and Co content of 1% (wt). The catalyst A11 was impregnated with chloroplatinic acid solution and palladium chloride solution of a volume equal to the pore volume of the carrier to obtain catalyst B11 with Pt content of 0.05% (wt) and Pd content of 0.15% (wt).

Example 12C

Alumina ball carrier (20 g) was impregnated with nickel nitrate solution and ferric nitrate solution of a volume equal to the pore volume of the carrier, then dried for 4 hours at 120° C. and calcinated for 4 hours at 550° C. to obtain catalyst A12 with Ni content of 1% (wt) and Fe content of 1% (wt). The catalyst A12 was impregnated with chloroplatinic acid solution and iridium trichloride solution of a volume equal to the pore volume of the carrier to obtain catalyst B12 with Pt content of 0.05% (wt) and Ir content of 0.15% (wt).

Example 13C

Alumina ball carrier (20 g) was impregnated with nickel nitrate solution and ferric nitrate solution of a volume equal to the pore volume of the carrier, then dried for 4 hours at 120° C. and calcinated for 4 hours at 550° C. to obtain catalyst A13 with Ni content of 1% (wt) and Fe content of 1% (wt). The catalyst A13 was impregnated with chloroplatinic acid solution and rhodium chloride solution of a volume equal to the pore volume of the carrier to obtain catalyst B13 with Pt content of 0.05% (wt) and Rh content of 0.15% (wt).

Example 14C

Alumina ball carrier (20 g) was impregnated with nickel nitrate solution and ferric nitrate solution of a volume equal to the pore volume of the carrier, then dried for 4 hours at 120° C. and calcinated for 4 hours at 550° C. to obtain catalyst A14 with Ni content of 1% (wt) and Fe content of 1% (wt). The catalyst A14 was impregnated with palladium chloride solution and iridium trichloride solution of a volume equal to the pore volume of the carrier to obtain catalyst B14 with Pd content of 0.05% (wt) and Ir content of 0.15% (wt).

Example 15C

Alumina ball carrier (20 g) was impregnated with nickel nitrate solution and ferric nitrate solution of a volume equal to the pore volume of the carrier, then dried for 4 hours at 120° C. and calcinated for 4 hours at 550° C. to obtain catalyst A15 with Ni content of 1% (wt) and Fe content of 1% (wt). The catalyst A1.5 was impregnated with rhodium chloride solution and iridium trichloride solution of a volume equal to the pore volume of the carrier to obtain catalyst B15 with Rh content of 0.05% (wt) and Ir content of 0.15% (wt).

Example 16C

Amorphous silica-alumina ball carrier (20 g) was impregnated with nickel nitrate solution and ferric nitrate solution of a volume equal to the pore volume of the carrier, then dried for 4 hours at 120° C. and calcinated for 4 hours at 550° C. to obtain catalyst A16 with Ni content of 1% (wt) and Fe content of 1% (wt). The catalyst A16 was impregnated with chloroplatinic acid solution and palladium chloride solution of a volume equal to the pore volume of the carrier to obtain catalyst B16 with Pt content of 0.05% (wt) and Pd content of 0.15% (wt).

Example 17C

Shaped carrier of Beta molecular sieve and alumina (20 g) was impregnated with nickel nitrate solution and ferric nitrate solution of a volume equal to the pore volume of the carrier, then dried for 4 hours at 120° C. and calcinated for 4 hours at 550° C. to obtain catalyst A17 with Ni content of 1% (wt) and Fe content of 1% (wt). The catalyst A1.7 was impregnated with chloroplatinic acid solution and palladium chloride solution of a volume equal to the pore volume of the carrier to obtain catalyst B17 with Pt content of 0.05% (wt) and Pd content of 0.15% (wt).

Example 18C

Alumina ball carrier (20 g) was impregnated with nickel nitrate solution and ferric nitrate solution of a volume equal to the pore volume of the carrier, then dried for 4 hours at 120° C. and calcinated for 4 hours at 550° C. to obtain catalyst A18 with Ni content of 1% (wt) and Fe content of 1% (wt). The catalyst A1.8 was impregnated with chloroplatinic acid solution and palladium chloride solution of a volume equal to the pore volume of the carrier to obtain catalyst B18 with Pt content of 0.03% (wt) and Pd content of 0.17% (wt).

Comparative Example 1C

Alumina ball carrier (20 g) was impregnated with chloroplatinic acid solution of a volume equal to the pore volume of the carrier to obtain catalyst B19 with Pt content of 0.2% (wt).

Comparative Example 2C

Alumina ball carrier (20 g) was impregnated with chloroplatinic acid solution and palladium chloride solution of a volume equal to the pore volume of the carrier to obtain catalyst B20 with Pt content of 0.05% (wt) and Pd content of 0.15% (wt).

Comparative Example 3C

Alumina ball carrier (20 g) was impregnated with nickel nitrate solution and ferric nitrate solution of a volume equal to the pore volume of the carrier, then dried for 4 hours at 120° C. and calcinated for 4 hours at 550° C. to obtain catalyst B21 with Ni content of 1% (wt) and Fe content of 1% (wt).

The catalysts prepared in Examples 1C to 18C and Comparative Examples 1C to 3C are evaluated by a following method. Catalyst (5 g) was placed in a reactor, and hydrogen was fed therein. Reduction reaction was performed for 3 hours at 450° C., and then a temperature thereof was reduced to 350° C. Hydrogen and materials containing toluene and naphthalene are fed therein and contact with the catalyst, and reaction activity was measured. Reaction conditions: a total weight airspeed was 10 h$^{-1}$; a reaction temperature was 350° C.; a reaction pressure was 3.0 MPa; and a molecular ratio of hydrogen to hydrocarbon was 3.0. In raw materials, toluene:naphthalene=90:10 (wt). The reaction performances are shown in Table 3, wherein R2/R1 represents a ratio of naphthalene hydrogenation ratio to toluene hydrogenation ratio, and reflects hydrogenation selectivity of each catalyst for polycyclic aromatics.

TABLE 3

| Examples | Component (2)/content (wt %) | Component (1)/content (wt %) | Hydrogen desorption temperature (° C.) | Toluene hydrogenation ratio (R1) wt % | Naphthalene hydrogenation ratio (R2) wt % | R2/R1 |
|---|---|---|---|---|---|---|
| 1C | Ni/2.0 | Pt/0.2 | 369 | 2.6 | 52.7 | 20.3 |
| 2C | Ni/5.0 | Pt/0.2 | 387 | 1.1 | 49.9 | 45.4 |
| 3C | Ni/2.0 | Pt/0.5 | 361 | 3.8 | 60.9 | 16.0 |
| 4C | Ni/2.0 | Pd/0.2 | 382 | 1.2 | 50.8 | 42.3 |
| 5C | Ni/2.0 | Ir/0.2 | 385 | 1.1 | 50.5 | 45.9 |
| 6C | Ni/2.0 | Rh/0.2 | 378 | 1.4 | 53.5 | 38.2 |
| 7C | Fe/2.0 | Pt/0.2 | 375 | 1.5 | 53.9 | 35.9 |
| 8C | Co/2.0 | Pt/0.2 | 373 | 1.4 | 54.1 | 38.6 |
| 9C | Fe/1.0-Ni/1.0 | Pt/0.05-Pd/0.15 | 386 | 1.2 | 65.1 | 54.2 |
| 10C | Fe/1.0-Co/1.0 | Pt/0.05-Pd/0.15 | 382 | 1.3 | 56.9 | 43.8 |
| 11C | Ni/1.0-Co/1.0 | Pt/0.05-Pd/0.15 | 381 | 1.3 | 55.8 | 42.9 |
| 12C | Fe/1.0-Ni/1.0 | Pt/0.05-Ir/0.15 | 385 | 1.1 | 55.2 | 50.2 |
| 13C | Fe/1.0-Ni/1.0 | Pt/0.05-Rh/0.15 | 382 | 1.2 | 56.1 | 46.8 |
| 14C | Fe/1-Ni/1.0 | Pd/0.05-Ir/0.15 | 380 | 1.3 | 54.9 | 42.2 |
| 15C | Fe/1-Ni/1.0 | Rh/0.05-Ir/0.15 | 383 | 1.2 | 56.8 | 47.3 |
| 16C | Fe/1.0-Ni/1.0 | Pt/0.05-Pd/0.15 | 381 | 1.3 | 63.9 | 49.1 |
| 17C | Fe/1.0-Ni/1.0 | Pt/0.05-Pd/0.15 | 376 | 1.6 | 64.5 | 40.3 |
| 18C | Fe/1.0-Ni/1.0 | Pt/0.03-Pd/0.17 | 382 | 1.1 | 58.6 | 53.2 |
| Comparative Example 1C | / | Pt/0.2 | 350 | 30.6 | 57.3 | 1.9 |
| Comparative Example 2C | | Pt/0.05-Pd/0.15 | 362 | 9.1 | 51.8 | 5.7 |
| Comparative Example 3C | Fe/1.0-Ni/1.0 | | 293 | 0.8 | 4.7 | 5.9 |

Example 1D

Alumina ball carrier (20 g) was impregnated with magnesium chloride solution of a volume equal to the pore volume of the carrier, then dried for 4 hours at 120° C. and calcinated for 4 hours at 550° C. to obtain catalyst A1 with Mg content of 3% (wt). The catalyst A1 was impregnated with chloroplatinic acid solution of a volume equal to the pore volume of the carrier to obtain catalyst B1 with Pt content of 0.15% (wt).

Example 2D

Alumina ball carrier (20 g) was impregnated with magnesium nitrate solution of a volume equal to the pore volume of the carrier, then dried for 4 hours at 120° C. and calcinated for 4 hours at 550° C. to obtain catalyst A2 with Mg content of 5% (wt). The catalyst A2 was impregnated with chloroplatinic acid solution of a volume equal to the pore volume of the carrier to obtain catalyst B2 with Pt content of 0.15% (wt).

Example 3D

Alumina ball carrier (20 g) was impregnated with magnesium chloride solution of a volume equal to the pore volume of the carrier, then dried for 4 hours at 120° C. and calcinated for 4 hours at 550° C. to obtain catalyst A3 with Mg content of 3% (wt). The catalyst A3 was impregnated with chloroplatinic acid solution of a volume equal to the pore volume of the carrier to obtain catalyst B3 with Pt content of 0.3% (wt).

Example 4D

Alumina ball carrier (20 g) was impregnated with magnesium chloride solution of a volume equal to the pore volume of the carrier, then dried for 4 hours at 120° C. and calcinated for 4 hours at 550° C. to obtain catalyst A4 with Mg content of 3% (wt). The catalyst A4 was impregnated with chloropalladium acid solution of a volume equal to the pore volume of the carrier to obtain catalyst B4 with Pd content of 0.15% (wt).

Example 5D

Alumina ball carrier (20 g) was impregnated with magnesium chloride solution of a volume equal to the pore volume of the carrier, then dried for 4 hours at 120° C. and calcinated for 4 hours at 550° C. to obtain catalyst A5 with Mg content of 3% (wt). The catalyst A5 was impregnated with chloroiridic acid solution of a volume equal to the pore volume of the carrier to obtain catalyst B5 with Ir content of 0.15% (wt).

Example 6D

Alumina ball carrier (20 g) was impregnated with strontium nitrate solution of a volume equal to the pore volume of the carrier, then dried for 4 hours at 120° C. and calcinated for 4 hours at 550° C. to obtain catalyst A6 with Sr content of 3% (wt). The catalyst A6 was impregnated with chloroplatinic acid solution of a volume equal to the pore volume of the carrier to obtain catalyst B6 with Pt content of 0.15% (wt).

Example 7D

Alumina ball carrier (20 g) was impregnated with calcium nitrate solution of a volume equal to the pore volume of the carrier, then dried for 4 hours at 120° C. and calcinated for 4 hours at 550° C. to obtain catalyst A7 with Ca content of 3% (wt). The catalyst A7 was impregnated with chloroplatinic acid solution of a volume equal to the pore volume of the carrier to obtain catalyst B7 with Pt content of 0.15% (wt).

Example 8D

Alumina ball carrier (20 g) was impregnated with potassium chloride solution of a volume equal to the pore volume of the carrier, then dried for 4 hours at 120° C. and calcinated for 4 hours at 550° C. to obtain catalyst A8 with K content of 3% (wt). The catalyst A8 was impregnated with chloroplatinic acid solution of a volume equal to the pore volume of the carrier to obtain catalyst B8 with Pt content of 0.15% (wt).

Example 9D

Alumina ball carrier (20 g) was impregnated with lithium chloride solution of a volume equal to the pore volume of the carrier, then dried for 4 hours at 120° C. and calcinated for 4 hours at 550° C. to obtain catalyst A9 with Li content of 3% (wt). The catalyst A9 was impregnated with chloroplatinic acid solution of a volume equal to the pore volume of the carrier to obtain catalyst B9 with Pt content of 0.15% (wt).

Example 10D

Alumina ball carrier (20 g) was impregnated with potassium chloride solution and strontium nitrate solution of a volume equal to the pore volume of the carrier, then dried for 4 hours at 120° C. and calcinated for 4 hours at 550° C. to obtain catalyst A10 with K content of 1% (wt) and Sr content of 2% (wt). The catalyst A10 was impregnated with chloroplatinic acid solution and chloroiridic acid solution of a volume equal to the pore volume of the carrier to obtain catalyst B10 with Pt content of 0.05% (wt) and Ir content of 0.1% (wt).

Example 11D

Alumina ball carrier (20 g) was impregnated with potassium chloride solution and lithium chloride solution of a volume equal to the pore volume of the carrier, then dried for 4 hours at 120° C. and calcinated for 4 hours at 550° C. to obtain catalyst A11 with K content of 1% (wt) and Li content of 2% (wt). The catalyst A11 was impregnated with chloroplatinic acid solution and chloroiridic acid solution of a volume equal to the pore volume of the carrier to obtain catalyst B11 with Pt content of 0.05% (wt) and Ir content of 0.1% (wt).

Example 12D

Alumina ball carrier (20 g) was impregnated with potassium chloride solution and magnesium nitrate solution of a volume equal to the pore volume of the carrier, then dried for 4 hours at 120° C. and calcinated for 4 hours at 550° C. to obtain catalyst A12 with K content of 1% (wt) and Mg content of 2% (wt). The catalyst A12 was impregnated with chloroplatinic acid solution and chloroiridic acid solution of a volume equal to the pore volume of the carrier to obtain catalyst B12 with Pt content of 0.05% (wt) and Ir content of 0.1% (wt).

Example 13D

Alumina ball carrier (20 g) was impregnated with magnesium chloride solution and strontium nitrate solution of a volume equal to the pore volume of the carrier, then dried for 4 hours at 120° C. and calcinated for 4 hours at 550° C. to obtain catalyst A13 with Mg content of 1% (wt) and Sr content of 2% (wt). The catalyst A13 was impregnated with chloroplatinic acid solution and chloropalladium acid solution of a volume equal to the pore volume of the carrier to obtain catalyst B13 with Pt content of 0.05% (wt) and Pd content of 0.1% (wt).

Example 14D

Alumina ball carrier (20 g) was impregnated with magnesium chloride solution and strontium nitrate solution of a volume equal to the pore volume of the carrier, then dried for 4 hours at 120° C. and calcinated for 4 hours at 550° C. to obtain catalyst A14 with Mg content of 1% (wt) and Sr content of 2% (wt). The catalyst A14 was impregnated with chloroplatinic acid solution and chloroiridic acid solution of a volume equal to the pore volume of the carrier to obtain catalyst B14 with Pt content of 0.05% (wt) and Ir content of 0.1% (wt).

Example 15D

Alumina ball carrier (20 g) was impregnated with magnesium chloride solution and strontium nitrate solution of a volume equal to the pore volume of the carrier, then dried for 4 hours at 120° C. and calcinated for 4 hours at 550° C. to obtain catalyst A15 with Mg content of 1% (wt) and Sr content of 2% (wt). The catalyst A15 was impregnated with chloroplatinic acid solution and chloroiridic acid solution of a volume equal to the pore volume of the carrier to obtain catalyst B15 with Pt content of 0.03% (wt) and Ir content of 0.12% (wt).

Example 16D

Alumina ball carrier (20 g) was impregnated with magnesium chloride solution and strontium nitrate solution of a volume equal to the pore volume of the carrier, then dried for 4 hours at 120° C. and calcinated for 4 hours at 550° C. to obtain catalyst A16 with Mg content of 1% (wt) and Sr content of 2% (wt). The catalyst A16 was impregnated with chloroplatinic acid solution and chloroiridic acid solution of a volume equal to the pore volume of the carrier to obtain catalyst B16 with Pt content of 0.1% (wt) and Ir content of 0.05% (wt).

Example 17D

Amorphous silica-alumina ball carrier (20 g) was impregnated with magnesium chloride solution and strontium nitrate solution of a volume equal to the pore volume of the carrier, then dried for 4 hours at 120° C. and calcinated for 4 hours at 550° C. to obtain catalyst A11 with Mg content of 1% (wt) and Sr content of 2% (wt). The catalyst A17 was impregnated with chloroplatinic acid solution and chloroiridic acid solution of a volume equal to the pore volume of the carrier to obtain catalyst B17 with Pt content of 0.05% (wt) and Ir content of 0.1% (wt).

Example 18D

Shaped carrier of dealuminized mordenite and alumina (20 g) was impregnated with magnesium chloride solution and strontium nitrate solution of a volume equal to the pore volume of the carrier, then dried for 4 hours at 120° C. and calcinated for 4 hours at 550° C. to obtain catalyst A18 with Mg content of 1% (wt) and Sr content of 2% (wt). The catalyst A18 was impregnated with chloroplatinic acid solution and chloroiridic acid solution of a volume equal to the pore volume of the carrier to obtain catalyst B18 with Pt content of 0.05% (wt) and Ir content of 0.1% (wt).

Comparative Example 1D

Alumina ball carrier (20 g) was impregnated with chloroplatinic acid solution of a volume equal to the pore volume of the carrier to obtain catalyst B19 with Pt content of 0.15% (wt).

Comparative Example 2D

Alumina ball carrier (20 g) was impregnated with chloroplatinic acid solution and chloroiridic acid solution of a volume equal to the pore volume of the carrier to obtain catalyst B20 with Pt content of 0.03% (wt) and Ir content of 0.12% (wt).

Comparative Example 3D

Alumina ball carrier (20 g) was impregnated with magnesium chloride solution and strontium nitrate solution of a volume equal to the pore volume of the carrier, then dried for 4 hours at 120° C. and calcinated for 4 hours at 550° C. to obtain catalyst B21 with Mg content of 1% (wt) and Sr content of 2% (wt).

The catalysts prepared in Examples 1D to 18D and Comparative Examples 1D to 3D are evaluated by a following method. Catalyst (5 g) was placed in a reactor, and hydrogen was fed therein. Reduction reaction was performed for 3 hours at 450° C., and then a temperature thereof was reduced to 350° C. Hydrogen and materials containing toluene and naphthalene are fed therein and contact with the catalyst, and reaction activity was measured. Reaction conditions: a total weight airspeed was 10 $h^{-1}$; a reaction temperature was 350° C.; a reaction pressure was 3.0 MPa; and a molecular ratio of hydrogen to hydrocarbon was 3.0. In raw materials, toluene:naphthalene=90:10 (wt).

The reaction performances are shown in Table 4.

TABLE 4

| Examples | Component (2)/content (wt %) | Component (1)/content (wt %) | Hydrogen desorption temperature (° C.) | Toluene hydrogenation ratio (R1) wt % | Naphthalene hydrogenation ratio (R2) wt % | R2/R1 |
|---|---|---|---|---|---|---|
| 1D | Mg/3.0 | Pt/0.15 | 369 | 2.1 | 56.7 | 27.0 |
| 2D | Mg/5.0 | Pt/0.15 | 370 | 1.6 | 53.3 | 33.3 |
| 3D | Mg/3.0 | Pt/0.3 | 362 | 2.5 | 61.8 | 24.7 |
| 4D | Mg/3.0 | Pd/0.15 | 371 | 1.5 | 52.4 | 34.9 |
| 5D | Mg/3.0 | Ir/0.15 | 372 | 1.3 | 54.7 | 42.1 |
| 6D | Sr/3.0 | Pt/0.15 | 374 | 1.4 | 62.9 | 44.9 |
| 7D | Ca/3.0 | Pt/0.15 | 368 | 2.1 | 57.9 | 27.6 |
| 8D | K/3.0 | Pt/0.15 | 364 | 2.3 | 60.8 | 26.4 |
| 9D | Li/3.0 | Pt/0.15 | 365 | 2.2 | 61.6 | 28.0 |
| 10D | K/1.0-Sr/2.0 | Pt/0.05-Ir/0.1 | 372 | 1.7 | 61.8 | 36.4 |
| 11D | K/1.0-Li/2.0 | Pt/0.05-Ir/0.1 | 364 | 2.1 | 62.7 | 29.9 |
| 12D | K/1.0-Mg/2.0 | Pt/0.05-Ir/0.1 | 361 | 2.4 | 62.2 | 25.9 |
| 13D | Mg/1.0-Sr/2.0 | Pt/0.05-Pd/0.1 | 375 | 1.4 | 64.5 | 46.1 |
| 14D | Mg/1.0-Sr/2.0 | Pt/0.05-Ir/0.1 | 379 | 1.2 | 64.7 | 53.9 |
| 15D | Mg/1.0-Sr/2.0 | Pt/0.03-Ir/0.12 | 381 | 1.1 | 60.3 | 54.8 |
| 16D | Mg/1.0-Sr/2.0 | Pt/0.1-Ir/0.05 | 376 | 1.5 | 65.1 | 43.4 |
| 17D | Mg/1.0-Sr/2.0 | Pt/0.05-Ir/0.1 | 378 | 1.3 | 64.3 | 49.5 |
| 18D | Mg/1.0-Sr/2.0 | Pt/0.05-Ir/0.1 | 377 | 1.5 | 65.3 | 43.5 |
| Comparative Example 1D | / | Pt/0.15 | 351 | 21.1 | 54.3 | 2.6 |
| Comparative Example 2D | / | Pt/0.03-Ir/0.12 | 366 | 2.9 | 54.8 | 18.9 |
| Comparative Example 3D | Mg/1.0-Sr/2.0 | | 325 | 0.5 | 3.8 | 7.6 |

Example 1E

Alumina ball carrier (20 g) was impregnated with lanthanum nitrate solution of a volume equal to the pore volume of the carrier, then dried for 4 hours at 120° C. and calcinated for 4 hours at 550° C. to obtain catalyst A1 with La content of 2% (wt). The catalyst A1 was impregnated with chloroplatinic acid solution of a volume equal to the pore volume of the carrier to obtain catalyst B1 with Pt content of 0.2% (wt).

Example 2E

Alumina ball carrier (20 g) was impregnated with cerium nitrate solution of a volume equal to the pore volume of the carrier, then dried for 4 hours at 120° C. and calcinated for 4 hours at 550° C. to obtain catalyst A2 with Ce content of 2% (wt). The catalyst A2 was impregnated with chloroplatinic acid solution of a volume equal to the pore volume of the carrier to obtain catalyst B2 with Pt content of 0.2% (wt).

Example 3E

Alumina ball carrier (20 g) was impregnated with praseodymium nitrate solution of a volume equal to the pore volume of the carrier, then dried for 4 hours at 120° C. and calcinated for 4 hours at 550° C. to obtain catalyst A3 with Pr content of 2% (wt). The catalyst A3 was impregnated with chloroplatinic acid solution of a volume equal to the pore volume of the carrier to obtain catalyst B3 with Pt content of 0.2% (wt).

Example 4E

Alumina ball carrier (20 g) was impregnated with lanthanum nitrate solution of a volume equal to the pore volume of the carrier, then dried for 4 hours at 120° C. and calcinated for 4 hours at 550° C. to obtain catalyst A4 with La content of 2% (wt). The catalyst A4 was impregnated with chloropalladium acid solution of a volume equal to the pore volume of the carrier to obtain catalyst B4 with Pd content of 0.2% (wt).

Example 5E

Alumina ball carrier (20 g) was impregnated with lanthanum nitrate solution of a volume equal to the pore volume of the carrier, then dried for 4 hours at 120° C. and calcinated for 4 hours at 550° C. to obtain catalyst A5 with La content of 2% (wt). The catalyst A5 was impregnated with chloroiridic acid aqueous solution of a volume equal to the pore volume of the carrier to obtain catalyst B5 with Ir content of 0.2% (wt).

Example 6E

Pseudo Boehmite (20 g) was impregnated with lanthanum nitrate solution and cerium nitrate solution, filtered, washed, and dried for 4 hours at 120° C. to obtain modified Pseudo Boehmite with La content of 1% (wt) and Ce content of 1% (wt). The modified Pseudo Boehmite was shaped and calcinated for 4 hours at 550° C. to obtain catalyst A6. The catalyst A6 was impregnated with chloroplatinic acid solution of a volume equal to the pore volume of the carrier to obtain catalyst B6 with Pt content of 0.2% (wt).

Example 7E

Alumina ball carrier (20 g) was impregnated with lanthanum nitrate solution and praseodymium nitrate solution of a volume equal to the pore volume of the carrier, then dried for 4 hours at 120° C. and calcinated for 4 hours at 550° C. to obtain catalyst A7 with La content of 1% (wt) and Pr content of 1% (wt). The catalyst A7 was impregnated with chloroplatinic acid solution of a volume equal to the pore volume of the carrier to obtain catalyst B7 with Pt content of 0.2% (wt).

Example 8E

Alumina ball carrier (20 g) was impregnated with cerium nitrate solution and praseodymium nitrate solution of a volume equal to the pore volume of the carrier, then dried for 4 hours at 120° C. and calcinated for 4 hours at 550° C. to obtain catalyst A8 with Ce content of 1% (wt) and Pr content of 1% (wt). The catalyst A8 was impregnated with chloroplatinic acid solution of a volume equal to the pore volume of the carrier to obtain catalyst B8 with Pt content of 0.2% (wt).

Example 9E

Alumina ball carrier (20 g) was impregnated with lanthanum nitrate solution and cerium nitrate solution of a volume equal to the pore volume of the carrier, then dried for 4 hours at 120° C. and calcinated for 4 hours at 550° C. to obtain catalyst A9 with La content of 1% (wt) and Ce content of 1% (wt). The catalyst A9 was impregnated with chloroplatinic acid solution and palladium chloride solution of a volume equal to the pore volume of the carrier to obtain catalyst B9 with Pt content of 0.1% (wt) and Pd content of 0.1% (wt).

Example 10E

Alumina ball carrier (20 g) was impregnated with lanthanum nitrate solution and cerium nitrate solution of a volume equal to the pore volume of the carrier, then dried for 4 hours at 120° C. and calcinated for 4 hours at 550° C. to obtain catalyst A10 with La content of 1% (wt) and Ce content of 1% (wt). The catalyst A10 was impregnated with chloroplatinic acid solution and iridium trichloride solution of a volume equal to the pore volume of the carrier to obtain catalyst B10 with Pt content of 0.1% (wt) and Ir content of 0.1% (wt).

Example 11E

Alumina ball carrier (20 g) was impregnated with lanthanum nitrate solution and cerium nitrate solution of a volume equal to the pore volume of the carrier, then dried for 4 hours at 120° C. and calcinated for 4 hours at 550° C. to obtain catalyst A11 with La content of 1% (wt) and Ce content of 1% (wt). The catalyst A11 was impregnated with iridium trichloride solution and palladium chloride solution of a volume equal to the pore volume of the carrier to obtain catalyst B11 with Ir content of 0.1% (wt) and Pd content of 0.1% (wt).

Example 12E

Alumina ball carrier (20 g) was impregnated with lanthanum nitrate solution and cerium nitrate solution of a volume equal to the pore volume of the carrier, then dried for 4 hours at 120° C. and calcinated for 4 hours at 550° C. to obtain catalyst A12 with La content of 1% (wt) and Ce content of 1% (wt). The catalyst A12 was impregnated with chloroplatinic acid solution and iridium trichloride solution of a volume equal to the pore volume of the carrier to obtain catalyst B12 with Pt content of 0.05% (wt) and Ir content of 0.15% (wt).

Example 13E

Amorphous silica-alumina ball carrier (20 g) was impregnated with lanthanum nitrate solution and cerium nitrate solution of a volume equal to the pore volume of the carrier, then dried for 4 hours at 120° C. and calcinated for 4 hours at 550° C. to obtain catalyst A13 with La content of 1% (wt) and Ce content of 1% (wt). The catalyst A13 was impregnated with chloroplatinic acid solution and iridium trichloride solution of a volume equal to the pore volume of the carrier to obtain catalyst B13 with Pt content of 0.05% (wt) and Ir content of 0.15% (wt).

Example 14E

Shaped carrier of dealuminized Beta zeolite (Si/Al=80) and alumina (20 g) was impregnated with lanthanum nitrate solution and cerium nitrate solution of a volume equal to the pore volume of the carrier, then dried for 4 hours at 120° C. and calcinated for 4 hours at 550° C. to obtain catalyst A14 with La content of 1% (wt) and Ce content of 1% (wt). The catalyst A14 was impregnated with chloroplatinic acid solution and iridium trichloride solution of a volume equal to the pore volume of the carrier to obtain catalyst B14 with Pt content of 0.05% (wt) and Ir content of 0.15% (wt).

Comparative Example 1E

Alumina ball carrier (20 g) was impregnated with chloroplatinic acid solution of a volume equal to the pore volume of the carrier to obtain catalyst B15 with Pt content of 0.2% (wt).

Comparative Example 2E

Alumina ball carrier (20 g) was impregnated with chloroplatinic acid solution and iridium trichloride solution of a volume equal to the pore volume of the carrier to obtain catalyst B16 with Pt content of 0.05% (wt) and Ir content of 0.15% (wt).

Comparative Example 3E

Alumina ball carrier (20 g) was impregnated with lanthanum nitrate solution and cerium nitrate solution of a volume equal to the pore volume of the carrier, then dried for 4 hours at 120° C. and calcinated for 4 hours at 550° C. to obtain catalyst B17 with La content of 1% (wt) and Ce content of 1% (wt).

The catalysts prepared in Examples 1E to 14E and Comparative Examples 1E to 3E are evaluated by a following method. Catalyst (5 g) was placed in a reactor, and hydrogen was fed therein. Reduction reaction was performed for 3 hours at 450° C., and then a temperature thereof was reduced to 350° C. Hydrogen and materials containing toluene and naphthalene are fed therein and contact with the catalyst, and reaction activity was measured. Reaction conditions: a total weight airspeed was 10 h$^{-1}$; a reaction temperature was 350° C.; a reaction pressure was 3.0 MPa; and a molecular ratio of hydrogen to hydrocarbon was 3.0. In raw materials, toluene:naphthalene=90:10 (wt). The reaction performances are shown in Table 5.

TABLE 5

| Examples | Component (2)/content (wt %) | Component (1)/content (wt %) | Hydrogen desorption temperature (° C.) | Toluene hydrogenation ratio (R1) wt % | Naphthalene hydrogenation ratio (R2) wt % | R2/R1 |
|---|---|---|---|---|---|---|
| 1E | La/2.0 | Pt/0.2 | 361 | 2.4 | 55.2 | 23.0 |
| 2E | Ce/2.0 | Pt/0.2 | 363 | 2.0 | 55.1 | 27.6 |
| 3E | Pr/2.0 | Pt/0.2 | 365 | 2.1 | 54.9 | 26.1 |
| 4E | La/2.0 | Pd/0.2 | 373 | 1.3 | 50.2 | 38.6 |
| 5E | La/2.0 | Ir/0.2 | 374 | 1.2 | 52.6 | 43.8 |
| 6E | La/1.0-Ce/1.0 | Pt/0.2 | 375 | 1.7 | 57.9 | 34.1 |
| 7E | La/1.0-Pr/1.0 | Pt/0.2 | 373 | 1.9 | 56.1 | 29.5 |
| 8E | Ce/1.0-Pr/1.0 | Pt/0.2 | 376 | 1.7 | 60.3 | 35.5 |
| 9E | La/1.0-Ce/1.0 | Pt/0.1-Pd/0.1 | 378 | 1.5 | 61.7 | 41.1 |
| 10E | La/1.0-Ce/1.0 | Pt/0.1-Ir/0.1 | 380 | 1.4 | 62.8 | 44.9 |
| 11E | La/1.0-Ce/1.0 | Pd/0.1-Ir/0.1 | 379 | 1.4 | 61.9 | 44.2 |
| 12E | La/1.0-Ce/1.0 | Pt/0.05-Ir/0.15 | 383 | 1.2 | 62.6 | 52.2 |
| 13E | La/1.0-Ce/1.0 | Pt/0.05-Ir/0.15 | 380 | 1.4 | 61.3 | 43.8 |
| 14E | La/1.0-Ce/1.0 | Pt/0.05-Ir/0.15 | 377 | 1.7 | 62.3 | 36.6 |
| Comparative Example 1E | / | Pt/0.2 | 350 | 30.6 | 57.3 | 1.9 |
| Comparative Example 2E | / | Pt/0.05-Ir/0.15 | 359 | 10.4 | 56.9 | 5.5 |
| Comparative Example 3E | La/1.0-Ce/1.0 | | 318 | 0.4 | 2.5 | 6.3 |

Example 1F

Alumina ball carrier (20 g) was impregnated with gallium chloride solution of a volume equal to the pore volume of the carrier, then dried for 4 hours at 120° C. and calcinated for 4 hours at 550° C. to obtain catalyst A1 with Ga content of 2% (wt). The catalyst A1 was impregnated with chloroplatinic acid solution of a volume equal to the pore volume of the carrier to obtain catalyst B1 with Pt content of 0.2% (wt).

Example 2F

Alumina ball carrier (20 g) was impregnated with germanium chloride solution of a volume equal to the pore volume of the carrier, then dried for 4 hours at 120° C. and calcinated for 4 hours at 550° C. to obtain catalyst A2 with Ge content of 2% (wt). The catalyst A2 was impregnated with chloroplatinic acid solution of a volume equal to the pore volume of the carrier to obtain core-shell metal layer catalyst B2 with Pt content of 0.2% (wt).

Example 3F

Alumina ball carrier (20 g) was impregnated with stannous chloride solution of a volume equal to the pore volume of the carrier, then dried for 4 hours at 120° C. and calcinated for 4 hours at 550° C. to obtain catalyst A3 with Sn content of 2% (wt). The catalyst A3 was impregnated with chloroplatinic acid solution of a volume equal to the pore volume of the carrier to obtain catalyst B3 with Pt content of 0.5% (wt).

Example 4F

Alumina ball carrier (20 g) was impregnated with lead nitrate solution of a volume equal to the pore volume of the carrier, then dried for 4 hours at 120° C. and calcinated for 4 hours at 550° C. to obtain catalyst A4 with Pb content of 2% (wt). The catalyst A4 was impregnated with chloroplatinic acid solution of a volume equal to the pore volume of the carrier to obtain catalyst B4 with Pt content of 0.2% (wt).

Example 5F

Alumina ball carrier (20 g) was impregnated with gallium chloride solution of a volume equal to the pore volume of the carrier, then dried for 4 hours at 120° C. and calcinated for 4 hours at 550° C. to obtain catalyst A5 with Ga content of 2% (wt). The catalyst A5 was impregnated with palladium chloride solution of a volume equal to the pore volume of the carrier to obtain catalyst B5 with Pd content of 0.2% (wt).

Example 6F

Alumina ball carrier (20 g) was impregnated with gallium chloride solution of a volume equal to the pore volume of the carrier, then dried for 4 hours at 120° C. and calcinated for 4 hours at 550° C. to obtain catalyst A6 with Ga content of 2% (wt). The catalyst A6 was impregnated with chloroiridic acid solution of a volume equal to the pore volume of the carrier to obtain catalyst B6 with Ir content of 0.2% (wt).

Example 7F

Alumina ball carrier (20 g) was impregnated with gallium chloride solution of a volume equal to the pore volume of the carrier, then dried for 4 hours at 120° C. and calcinated for 4 hours at 550° C. to obtain catalyst A7 with Ga content of 2% (wt). The catalyst A7 was impregnated with rhodium chloride solution of a volume equal to the pore volume of the carrier to obtain catalyst B7 with Rh content of 0.2% (wt).

Example 8F

Alumina ball carrier (20 g) was impregnated with gallium chloride solution and stannous chloride solution of a volume equal to the pore volume of the carrier, then dried for 4 hours at 120° C. and calcinated for 4 hours at 550° C. to obtain catalyst A8 with Ga content of 1% (wt) and Sn content of 1% (wt). The catalyst A8 was impregnated with chloroplatinic acid solution of a volume equal to the pore volume of the carrier to obtain catalyst B8 with Pt content of 0.2% (wt).

Example 9F

Alumina ball carrier (20 g) was impregnated with gallium chloride solution and stannous chloride solution of a volume equal to the pore volume of the carrier, then dried for 4 hours at 120° C. and calcinated for 4 hours at 550° C. to obtain catalyst A9 with Ga content of 1% (wt) and Sn content of 1% (wt). The catalyst A9 was impregnated with rhodium chloride solution and palladium chloride solution of a volume equal to the pore volume of the carrier to obtain catalyst B9 with Rh content of 0.1% (wt) and Pd content of 0.1% (wt).

Example 10F

Alumina ball carrier (20 g) was impregnated with gallium chloride solution and stannous chloride solution of a volume equal to the pore volume of the carrier, then dried for 4 hours at 120° C. and calcinated for 4 hours at 550° C. to obtain catalyst A10 with Ga content of 1% (wt) and Sn content of 1% (wt). The catalyst A10 was impregnated with chloroplatinic acid solution and palladium chloride solution of a volume equal to the pore volume of the carrier to obtain catalyst B10 with Pt content of 0.1% (wt) and Pd content of 0.1% (wt).

Example 11F

Alumina ball carrier (20 g) was impregnated with gallium chloride solution and stannous chloride solution of a volume equal to the pore volume of the carrier, then dried for 4 hours at 120° C. and calcinated for 4 hours at 550° C. to obtain catalyst A11 with Ga content of 1% (wt) and Sn content of 1% (wt). The catalyst A11 was impregnated with chloroiridic acid solution and palladium chloride solution of a volume equal to the pore volume of the carrier to obtain catalyst B11 with Ir content of 0.1% (wt) and Pd content of 0.1% (wt).

Example 12F

Alumina ball carrier (20 g) was impregnated with gallium chloride solution and stannous chloride solution of a volume equal to the pore volume of the carrier, then dried for 4 hours at 120° C. and calcinated for 4 hours at 550° C. to obtain catalyst A12 with Ga content of 1% (wt) and Sn content of 1% (wt). The catalyst A12 was impregnated with chloroplatinic acid solution and chloroiridic acid solution of a volume equal to the pore volume of the carrier to obtain catalyst B12 with Pt content of 0.1% (wt) and Ir content of 0.1% (wt).

Example 13F

Alumina ball carrier (20 g) was impregnated with gallium chloride solution and stannous chloride solution of a volume equal to the pore volume of the carrier, then dried for 4 hours at 120° C. and calcinated for 4 hours at 550° C. to obtain catalyst A13 with Ga content of 1% (wt) and Sn content of 1% (wt). The catalyst A13 was impregnated with chloroplatinic acid solution and rhodium chloride solution of a volume equal to the pore volume of the carrier to obtain catalyst B13 with Pt content of 0.1% (wt) and Rh content of 0.1% (wt).

Example 14F

Alumina ball carrier (20 g) was impregnated with gallium chloride solution and stannous chloride solution of a volume equal to the pore volume of the carrier, then dried for 4 hours at 120° C. and calcinated for 4 hours at 550° C. to obtain catalyst A14 with Ga content of 1% (wt) and Sn content of 1% (wt). The catalyst A14 was impregnated with palladium chloride solution and rhodium chloride solution of a volume equal to the pore volume of the carrier to obtain catalyst B14 with Pd content of 0.05% (wt) and Rh content of 0.15% (wt).

Example 15F

Alumina ball carrier (20 g) was impregnated with gallium chloride solution and stannous chloride solution of a volume equal to the pore volume of the carrier, then dried for 4 hours at 120° C. and calcinated for 4 hours at 550° C. to obtain catalyst A15 with Ga content of 1% (wt) and Sn content of 1% (wt). The catalyst A15 was impregnated with palladium chloride solution and rhodium chloride solution of a volume equal to the pore volume of the carrier to obtain catalyst B15 with Pd content of 0.15% (wt) and Rh content of 0.05% (wt).

Example 16F

Alumina ball carrier (20 g) was impregnated with gallium chloride solution and germanium chloride solution of a volume equal to the pore volume of the carrier, then dried for 4 hours at 120° C. and calcinated for 4 hours at 550° C. to obtain catalyst A16 with Ga content of 1% (wt) and Ge content of 1% (wt). The catalyst A16 was impregnated with palladium chloride solution and rhodium chloride solution of a volume equal to the pore volume of the carrier to obtain catalyst B16 with Pd content of 0.15% (wt) and Rh content of 0.05% (wt).

Example 17F

Alumina ball carrier (20 g) was impregnated with gallium chloride solution and lead nitrate solution of a volume equal to the pore volume of the carrier, then dried for 4 hours at 120° C. and calcinated for 4 hours at 550° C. to obtain catalyst A17 with Ga content of 1% (wt) and Pb content of 1% (wt). The catalyst A11 was impregnated with palladium chloride solution and rhodium chloride solution of a volume equal to the pore volume of the carrier to obtain catalyst B17 with Pd content of 0.15% (wt) and Rh content of 0.05% (wt).

Example 18F

Amorphous silica-alumina ball carrier (20 g) was impregnated with gallium chloride solution and stannous chloride solution of a volume equal to the pore volume of the carrier, then dried for 4 hours at 120° C. and calcinated for 4 hours at 550° C. to obtain catalyst A18 with Ga content of 1% (wt) and Sn content of 1% (wt). The catalyst A18 was impregnated with palladium chloride solution and rhodium chloride solution of a volume equal to the pore volume of the carrier to obtain catalyst B18 with Pd content of 0.15% (wt) and Rh content of 0.05% (wt).

Example 19F

Shaped carrier of high silicon Y molecular sieve and alumina (20 g) was impregnated with gallium chloride solution and stannous chloride solution of a volume equal to the pore volume of the carrier, then dried for 4 hours at 120° C. and calcinated for 4 hours at 550° C. to obtain catalyst A19 with Ga content of 1% (wt) and Sn content of 1% (wt). The catalyst A19 was impregnated with palladium chloride solution and rhodium chloride solution of a volume equal to the pore volume of the carrier to obtain catalyst B19 with Pd content of 0.15% (wt) and Rh content of 0.05% (wt).

Comparative Example 1F

Alumina ball carrier (20 g) was impregnated with palladium chloride solution of a volume equal to the pore volume of the carrier to obtain catalyst B20 with Pd content of 0.2% (wt).

Comparative Example 2F

Alumina ball carrier (20 g) was impregnated with palladium chloride solution and rhodium chloride solution of a volume equal to the pore volume of the carrier to obtain catalyst B21 with Pd content of 0.05% (wt) and Rh content of 0.15% (wt).

Comparative Example 3F

Alumina ball carrier (20 g) was impregnated with gallium chloride solution and stannous chloride solution of a volume equal to the pore volume of the carrier, then dried for 4 hours at 120° C. and calcinated for 4 hours at 550° C. to obtain catalyst B22 with Ga content of 1% (wt) and Sn content of 1% (wt).

The catalysts prepared in Examples 1F to 19F and Comparative Examples 1F to 3F are evaluated by a following method. Catalyst (5 g) was placed in a reactor, and hydrogen was fed therein. Reduction reaction was performed for 3 hours at 450° C., and then a temperature thereof was reduced to 350° C. Hydrogen and materials containing toluene and naphthalene are fed therein and contact with the catalyst, and reaction activity was measured. Reaction conditions: a total weight airspeed was 10 h$^{-1}$; a reaction temperature was 350° C.; a reaction pressure was 3.0 MPa; and a molecular ratio of hydrogen to hydrocarbon was 3.0. In raw materials, toluene:naphthalene=90:10 (wt). The reaction performances are shown in Table 6.

TABLE 6

| Examples | Component (2)/content (wt %) | Component (1)/content (wt %) | Hydrogen desorption temperature (° C.) | Toluene hydrogenation ratio (R1) wt % | Naphthalene hydrogenation ratio (R2) wt % | R2/R1 |
|---|---|---|---|---|---|---|
| 1F | Ga/2.0 | Pt/0.2 | 374 | 1.6 | 56.2 | 35.1 |
| 2F | Ge/5.0 | Pt/0.2 | 371 | 1.8 | 57.9 | 32.2 |
| 3F | Sn/2.0 | Pt/0.2 | 376 | 1.7 | 59.9 | 35.2 |
| 4F | Pb/2.0 | Pt/0.2 | 375 | 1.7 | 58.8 | 34.6 |
| 5F | Ga/2.0 | Pd/0.2 | 381 | 1.3 | 56.5 | 43.5 |
| 6F | Ga/2.0 | Ir/0.2 | 382 | 1.3 | 55.7 | 42.8 |
| 7F | Ga/2.0 | Rh/0.2 | 380 | 1.4 | 58.9 | 42.1 |
| 8F | Ga/1.0-Sn/1.0 | Pt/0.2 | 376 | 1.6 | 59.1 | 36.9 |
| 9F | Ga/1.0-Sn/1.0 | Pd/0.1-Rh/0.1 | 383 | 1.3 | 59.1 | 45.5 |
| 10F | Ga/1.0-Sn/1.0 | Pt/0.1-Pd/0.1 | 381 | 1.5 | 61.8 | 41.2 |
| 11F | Ga/1.0-Sn/1.0 | Pd/0.1-Ir/0.1 | 385 | 1.3 | 58.2 | 44.8 |
| 12F | Ga/1.0-Sn/1.0 | Pt/0.1-Ir/0.1 | 379 | 1.5 | 60.7 | 40.5 |
| 13F | Ga/1.0-Sn/1.0 | Pt/0.1-Rh/0.1 | 374 | 1.7 | 64.9 | 38.2 |
| 14F | Ga/1.0-Sn/1.0 | Pd/0.05-Rh/0.15 | 386 | 1.2 | 58.9 | 49.1 |
| 15F | Ga/1.0-Sn/1.0 | Pd/0.15-Rh/0.05 | 385 | 1.3 | 63.6 | 48.9 |
| 16F | Ga/1.0-Ge/1.0 | Pd/0.15-Rh/0.05 | 380 | 1.4 | 60.5 | 43.2 |
| 17F | Ga/1.0-Pb/1.0 | Pd/0.15-Rh/0.05 | 382 | 1.3 | 57.9 | 44.5 |
| 18F | Ga/1.0-Sn/1.0 | Pd/0.15-Rh/0.05 | 381 | 1.4 | 62.8 | 44.9 |
| 19F | Ga/1.0-Sn/1.0 | Pd/0.15-Rh/0.05 | 374 | 1.8 | 63.1 | 35.1 |
| Comparative Example 1F | / | Pd/0.2 | 363 | 21.6 | 54.1 | 2.5 |
| Comparative Example 2F | / | Pd/0.05-Rh/0.15 | 367 | 8.2 | 57.7 | 7.0 |
| Comparative Example 3F | Ga/1.0-Sn/11.0 | | 307 | 0.4 | 3.1 | 7.8 |

Example 1G

Alumina ball carrier (20 g) was impregnated with zirconium chloride solution of a volume equal to the pore volume of the carrier, then dried for 4 hours at 120° C. and calcinated for 4 hours at 550° C. to obtain catalyst A1 with Zr content of 3% (wt). The catalyst A1 was impregnated with chloroplatinic acid solution of a volume equal to the pore volume of the carrier to obtain catalyst B1 with Pt content of 0.3% (wt).

Example 2G

Alumina ball carrier (20 g) was impregnated with zirconium chloride solution of a volume equal to the pore volume of the carrier, then dried for 4 hours at 120° C. and calcinated for 4 hours at 550° C. to obtain catalyst A2 with Zr content of 6% (wt). The catalyst A2 was impregnated with chloroplatinic acid solution of a volume equal to the pore volume of the carrier to obtain catalyst B2 with Pt content of 0.3% (wt).

Example 3G

Alumina ball carrier (20 g) was impregnated with zirconium chloride solution of a volume equal to the pore volume of the carrier, then dried for 4 hours at 120° C. and calcinated for 4 hours at 550° C. to obtain catalyst A3 with Zr content of 3% (wt). The catalyst A3 was impregnated with chloroplatinic acid solution of a volume equal to the pore volume of the carrier to obtain catalyst B3 with Pt content of 0.5% (wt).

Example 4G

Alumina ball carrier (20 g) was impregnated with zirconium chloride solution of a volume equal to the pore volume of the carrier, then dried for 4 hours at 120° C. and calcinated for 4 hours at 550° C. to obtain catalyst A4 with Zr content of 3% (wt). The catalyst A4 was impregnated with chloropalladium acid solution of a volume equal to the pore volume of the carrier to obtain catalyst B4 with Pd content of 0.3% (wt).

Example 5G

Alumina ball carrier (20 g) was impregnated with zirconium chloride solution of a volume equal to the pore volume of the carrier, then dried for 4 hours at 120° C. and calcinated for 4 hours at 550° C. to obtain catalyst A5 with Zr content of 3% (wt). The catalyst A5 was impregnated with chloroiridic acid solution of a volume equal to the pore volume of the carrier to obtain catalyst B5 with Ir content of 0.3% (wt).

Example 6G

Alumina ball carrier (20 g) was impregnated with vanadium nitrate solution of a volume equal to the pore volume of the carrier, then dried for 4 hours at 120° C. and calcinated for 4 hours at 550° C. to obtain catalyst A6 with V content of 3% (wt). The catalyst A6 was impregnated with chloroplatinic acid solution of a volume equal to the pore volume of the carrier to obtain catalyst B6 with Pt content of 0.3% (wt).

Example 7G

Alumina ball carrier (20 g) was impregnated with titanium trichloride solution of a volume equal to the pore volume of the carrier, then dried for 4 hours at 120° C. and calcinated for 4 hours at 550° C. to obtain catalyst A7 with Ti content of 3% (wt). The catalyst A7 was impregnated with chloroplatinic acid solution of a volume equal to the pore volume of the carrier to obtain catalyst B7 with Pt content of 0.3% (wt).

Example 8G

Alumina ball carrier (20 g) was impregnated with niobium oxalate solution of a volume equal to the pore volume of the carrier, then dried for 4 hours at 120° C. and calcinated for 4 hours at 550° C. to obtain catalyst A8 with Nb content of 3% (wt). The catalyst A8 was impregnated with chloroplatinic acid solution of a volume equal to the pore volume of the carrier to obtain catalyst B8 with Pt content of 0.3% (wt).

Example 9G

Alumina ball carrier (20 g) was impregnated with zirconium chloride solution and sodium vanadate solution of a volume equal to the pore volume of the carrier, then dried for 4 hours at 120° C. and calcinated for 4 hours at 550° C. to obtain catalyst A9 with Zr content of 1% (wt) and V content of 2% (wt). The catalyst A9 was impregnated with chloroplatinic acid solution and palladium chloride solution of a volume equal to the pore volume of the carrier to obtain catalyst B9 with Pt content of 0.1% (wt) and Pd content of 0.2% (wt).

Example 10G

Alumina ball carrier (20 g) was impregnated with zirconium chloride solution and titanium chloride solution of a volume equal to the pore volume of the carrier, then dried for 4 hours at 120° C. and calcinated for 4 hours at 550° C. to obtain catalyst A10 with Zr content of 1% (wt) and Ti content of 2% (wt). The catalyst A10 was impregnated with chloroplatinic acid solution and palladium chloride solution of a volume equal to the pore volume of the carrier to obtain catalyst B10 with Pt content of 0.1% (wt) and Pd content of 0.2% (wt).

Example 11G

Alumina ball carrier (20 g) was impregnated with zirconium chloride solution and niobium oxalate solution of a volume equal to the pore volume of the carrier, then dried for 4 hours at 120° C. and calcinated for 4 hours at 550° C. to obtain catalyst A11 with Zr content of 1% (wt) and Nb content of 2% (wt). The catalyst A11 was impregnated with chloroplatinic acid solution and palladium chloride solution of a volume equal to the pore volume of the carrier to obtain catalyst B11 with Pt content of 0.1% (wt) and Pd content of 0.2% (wt).

Example 12G

Alumina ball carrier (20 g) was impregnated with sodium vanadate solution and titanium trichloride solution of a volume equal to the pore volume of the carrier, then dried for 4 hours at 120° C. and calcinated for 4 hours at 550° C. to obtain catalyst A12 with V content of 1% (wt) and Ti content of 2% (wt). The catalyst A12 was impregnated with chloroplatinic acid solution and palladium chloride solution of a volume equal to the pore volume of the carrier to obtain catalyst B12 with Pt content of 0.1% (wt) and Pd content of 0.2% (wt).

Example 13G

Alumina ball carrier (20 g) was impregnated with sodium vanadate solution and niobium oxalate solution of a volume equal to the pore volume of the carrier, then dried for 4 hours at 120° C. and calcinated for 4 hours at 550° C. to obtain catalyst A13 with V content of 1% (wt) and Nb content of 2% (wt). The catalyst A13 was impregnated with chloroplatinic acid solution and palladium chloride solution of a volume equal to the pore volume of the carrier to obtain catalyst B13 with Pt content of 0.1% (wt) and Pd content of 0.2% (wt).

Example 14G

Alumina ball carrier (20 g) was impregnated with titanium chloride solution and niobium oxalate solution of a volume equal to the pore volume of the carrier, then dried for 4 hours at 120° C. and calcinated for 4 hours at 550° C. to obtain catalyst A14 with Ti content of 1% (wt) and Nb content of 2% (wt). The catalyst A14 was impregnated with chloroplatinic acid solution and palladium chloride solution of a volume equal to the pore volume of the carrier to obtain catalyst B14 with Pt content of 0.1% (wt) and Pd content of 0.2% (wt).

Example 15G

Alumina ball carrier (20 g) was impregnated with zirconium chloride solution and niobium oxalate solution of a volume equal to the pore volume of the carrier, then dried for 4 hours at 120° C. and calcinated for 4 hours at 550° C. to obtain catalyst A15 with Zr content of 1% (wt) and Nb content of 2% (wt). The catalyst A15 was impregnated with chloroplatinic acid solution and rhodium chloride solution of a volume equal to the pore volume of the carrier to obtain catalyst B15 with Pt content of 0.1% (wt) and Rh content of 0.2% (wt).

Example 16G

Alumina ball carrier (20 g) was impregnated with zirconium chloride solution and niobium oxalate solution of a volume equal to the pore volume of the carrier, then dried for 4 hours at 120° C. and calcinated for 4 hours at 550° C. to obtain catalyst A16 with Zr content of 1% (wt) and Nb content of 2% (wt). The catalyst A16 was impregnated with rhodium chloride solution and chloropalladium acid solution of a volume equal to the pore volume of the carrier to obtain catalyst B16 with Rh content of 0.1% (wt) and Pd content of 0.2% (wt).

Example 17G

Alumina ball carrier (20 g) was impregnated with zirconium chloride solution and niobium oxalate solution of a volume equal to the pore volume of the carrier, then dried for 4 hours at 120° C. and calcinated for 4 hours at 550° C. to obtain catalyst A17 with Zr content of 1% (wt) and Nb content of 2% (wt). The catalyst A17 was impregnated with rhodium chloride solution and chloroiridic acid solution of a volume equal to the pore volume of the carrier to obtain catalyst B17 with Rh content of 0.1% (wt) and Ir content of 0.2% (wt).

Example 18G

Alumina ball carrier (20 g) was impregnated with zirconium chloride solution and niobium oxalate solution of a volume equal to the pore volume of the carrier, then dried for 4 hours at 120° C. and calcinated for 4 hours at 550° C. to obtain catalyst A18 with Zr content of 1% (wt) and Nb content of 2% (wt). The catalyst A18 was impregnated with chloroplatinic acid solution and iridium trichloride solution of a volume equal to the pore volume of the carrier to obtain catalyst B18 with Pt content of 0.1% (wt) and Ir content of 0.2% (wt).

Example 19G

Alumina ball carrier (20 g) was impregnated with zirconium chloride solution and niobium oxalate solution of a volume equal to the pore volume of the carrier, then dried for 4 hours at 120° C. and calcinated for 4 hours at 550° C. to obtain catalyst A19 with Zr content of 1% (wt) and Nb content of 2% (wt). The catalyst A19 was impregnated with chloroplatinic acid solution and palladium chloride solution of a volume equal to the pore volume of the carrier to obtain catalyst B19 with Pt content of 0.03% (wt) and Pd content of 0.27% (wt).

Example 20G

Alumina ball carrier (20 g) was impregnated with zirconium chloride solution and niobium oxalate solution of a volume equal to the pore volume of the carrier, then dried for 4 hours at 120° C. and calcinated for 4 hours at 550° C. to obtain catalyst A20 with Zr content of 1% (wt) and Nb content of 2% (wt). The catalyst A20 was impregnated with chloroplatinic acid solution and rhodium chloride solution of a volume equal to the pore volume of the carrier to obtain catalyst B20 with Pt content of 0.1% (wt) and Rh content of 0.2% (wt).

Example 21G

Amorphous silica-alumina ball carrier (20 g) was impregnated with zirconium chloride solution and niobium oxalate solution of a volume equal to the pore volume of the carrier, then dried for 4 hours at 120° C. and calcinated for 4 hours at 550° C. to obtain catalyst A21 with Zr content of 1% (wt) and Nb content of 2% (wt). The catalyst A21 was impregnated with chloroplatinic acid solution and palladium chloride solution of a volume equal to the pore volume of the carrier to obtain catalyst B21 with Pt content of 0.1% (wt) and Pd content of 0.2% (wt).

Example 22G

Shaped carrier of Y molecular sieve (Si/Al=30) and alumina (20 g) was impregnated with zirconium chloride solution and niobium oxalate solution of a volume equal to the pore volume of the carrier, then dried for 4 hours at 120° C. and calcinated for 4 hours at 550° C. to obtain catalyst A22 with Zr content of 1% (wt) and Nb content of 2% (wt). The catalyst A22 was impregnated with chloroplatinic acid solution and palladium chloride solution of a volume equal to the pore volume of the carrier to obtain catalyst B22 with Pt content of 0.1% (wt) and Pd content of 0.2% (wt).

Comparative Example 1G

Alumina ball carrier (20 g) was impregnated with chloroplatinic acid solution of a volume equal to the pore volume of the carrier to obtain catalyst B23 with Pt content of 0.3% (wt).

Comparative Example 2G

Alumina ball carrier (20 g) was impregnated with chloroplatinic acid solution and chloropalladium acid solution of a volume equal to the pore volume of the carrier to obtain catalyst B24 with Pt content of 0.1% (wt) and Pd content of 0.2% (wt).

Comparative Example 3G

Alumina ball carrier (20 g) was impregnated with zirconium chloride solution and niobium oxalate solution of a volume equal to the pore volume of the carrier to obtain catalyst B25 with Zr content of 1% (wt) and Nb content of 2% (wt).

The catalysts prepared in Examples 1G to 22G and Comparative Examples 1G to 3G are evaluated by a following method. Catalyst (5 g) was placed in a reactor, and hydrogen was fed therein. Reduction reaction was performed for 3 hours at 450° C., and then a temperature thereof was reduced to 350° C. Hydrogen and materials containing toluene and naphthalene are fed therein and contact with the catalyst, and reaction activity was measured. Reaction conditions: a total weight airspeed was 10 h$^{-1}$; a reaction temperature was 370° C.; a reaction pressure was 3.0 MPa; and a molecular ratio of hydrogen to hydrocarbon was 4.0. In raw materials, toluene:naphthalene=40:60 (wt). The reaction performances are shown in Table 7.

TABLE 7

| Examples | Component (2)/content (wt %) | Component (1)/content (wt %) | Hydrogen desorption temperature (° C.) | Toluene hydrogenation ratio (R1) wt % | Naphthalene hydrogenation ratio (R2) wt % | R2/R1 |
|---|---|---|---|---|---|---|
| 1G | Zr/3.0 | Pt/0.3 | 378 | 1.4 | 50.7 | 36.2 |
| 2G | Zr/6.0 | Pt/0.3 | 385 | 1.2 | 47.9 | 39.9 |
| 3G | Zr/3.0 | Pt/0.5 | 373 | 2.1 | 55.1 | 26.2 |
| 4G | Zr/3.0 | Pd/0.3 | 386 | 1.1 | 43.8 | 39.8 |
| 5G | Zr/3.0 | Ir/0.3 | 387 | 1.1 | 44.5 | 40.5 |
| 6G | V/3.0 | Pt/0.3 | 382 | 1.3 | 51.7 | 39.8 |

TABLE 7-continued

| Examples | Component (2)/content (wt %) | Component (1)/content (wt %) | Hydrogen desorption temperature (° C.) | Toluene hydrogenation ratio (R1) wt % | Naphthalene hydrogenation ratio (R2) wt % | R2/R1 |
|---|---|---|---|---|---|---|
| 7G | Ti/3.0 | Pt/0.3 | 390 | 1.1 | 49.3 | 44.8 |
| 8G | Nb/3.0 | Pt/0.3 | 389 | 1.2 | 54.2 | 45.2 |
| 9G | Zr/1.0-V/2.0 | Pt/0.1-Pd/0.2 | 388 | 1.2 | 51.8 | 43.2 |
| 10G | Zr/1.0-Ti/2.0 | Pt/0.1-Pd/0.2 | 385 | 1.3 | 50.8 | 39.1 |
| 11G | Zr/1.0-Nb/2.0 | Pt/0.1-Pd/0.2 | 386 | 1.2 | 55.2 | 46.0 |
| 12G | V/1.0-Ti/2.0 | Pt/0.1-Pd/0.2 | 388 | 1.1 | 47.8 | 43.5 |
| 13G | V/1.0-Nb/2.0 | Pt/0.1-Pd/0.2 | 384 | 1.3 | 51.9 | 39.9 |
| 14G | Ti/1.0-Nb/2.0 | Pt/0.1-Pd/0.2 | 385 | 1.2 | 52.9 | 44.1 |
| 15G | Zr/1.0-Nb/2.0 | Pt/0.1-Rh/0.2 | 380 | 1.4 | 56.9 | 40.6 |
| 16G | Zr/1.0-Nb/2.0 | Rh/0.1-Pd/0.2 | 383 | 1.3 | 54.8 | 42.2 |
| 17G | Zr/1.0-Nb/2% | Rh/0.1-Ir/0.2 | 382 | 1.3 | 53.9 | 41.5 |
| 18G | Zr/1.0-Nb/2.0 | Pt/0.1-Ir/0.2 | 381 | 1.2 | 54.4 | 45.3 |
| 19G | Zr/1.0-Nb/2.0 | Pt/0.03-Pd/0.27 | 396 | 1.0 | 44.6 | 44.6 |
| 20G | Zr/1.0-Nb/2.0 | Pt/0.2-Pd/0.1 | 377 | 1.5 | 59.8 | 39.9 |
| 21G | Zr/1.0-Nb/2.0 | Pt/0.1-Pd/0.2 | 378 | 1.4 | 55.8 | 39.9 |
| 22G | Zr/1.0-Nb/2.0 | Pt/0.1-Pd/0.2 | 375 | 1.7 | 56.9 | 33.5 |
| Comparative Example 1G | / | Pt/0.3 | 350 | 11.8 | 36.9 | 3.1 |
| Comparative Example 2G | / | Pt/0.1-Pd/0.2 | 358 | 9.8 | 41.9 | 4.3 |
| Comparative Example 3G | Zr/1.0-Nb/2.0 | / | 309 | 0.9 | 7.9 | 8.8 |

Example 1I

Alumina ball carrier (20 g) was impregnated with yttrium nitrate solution of a volume equal to the pore volume of the carrier, then dried for 4 hours at 120° C. and calcinated for 4 hours at 550° C. to obtain catalyst A1 with Y content of 5% (wt). The catalyst A1 was impregnated with chloroplatinic acid solution of a volume equal to the pore volume of the carrier to obtain catalyst B1 with Pt content of 0.3% (wt).

Example 2I

Alumina ball carrier (20 g) was impregnated with scandium nitrate solution of a volume equal to the pore volume of the carrier, then dried for 4 hours at 120° C. and calcinated for 4 hours at 550° C. to obtain catalyst A2 with Sc content of 5% (wt). The catalyst A2 was impregnated with chloroplatinic acid solution of a volume equal to the pore volume of the carrier to obtain catalyst B2 with Pt content of 0.3% (wt).

Example 3I

Alumina ball carrier (20 g) was impregnated with yttrium nitrate solution of a volume equal to the pore volume of the carrier, then dried for 4 hours at 120° C. and calcinated for 4 hours at 550° C. to obtain catalyst A3 with Y content of 5% (wt). The catalyst A3 was impregnated with palladium chloride solution of a volume equal to the pore volume of the carrier to obtain catalyst B3 with Pd content of 0.3% (wt).

Example 4I

Alumina ball carrier (20 g) was impregnated with yttrium nitrate solution of a volume equal to the pore volume of the carrier, then dried for 4 hours at 120° C. and calcinated for 4 hours at 550° C. to obtain catalyst A4 with Y content of 5% (wt). The catalyst A4 was impregnated with chloroiridic acid solution of a volume equal to the pore volume of the carrier to obtain catalyst B4 with Ir content of 0.3% (wt).

Example 5I

Alumina ball carrier (20 g) was impregnated with yttrium nitrate solution of a volume equal to the pore volume of the carrier, then dried for 4 hours at 120° C. and calcinated for 4 hours at 550° C. to obtain catalyst A5 with Y content of 5% (wt). The catalyst A5 was impregnated with chloroplatinic acid solution and palladium chloride solution of a volume equal to the pore volume of the carrier to obtain catalyst B5 with Pt content of 0.1% (wt) and Pd content of 0.2% (wt).

Example 6I

Alumina ball carrier (20 g) was impregnated with yttrium nitrate solution and scandium nitrate solution of a volume equal to the pore volume of the carrier, then dried for 4 hours at 120° C. and calcinated for 4 hours at 550° C. to obtain catalyst A6 with Y content of 2% (wt) and Sc content of 3% (wt). The catalyst A6 was impregnated with chloroplatinic acid ethanol solution of a volume equal to the pore volume of the carrier to obtain catalyst B6 with Pt content of 0.3% (wt).

Example 7I

Alumina ball carrier (20 g) was impregnated with yttrium nitrate solution and scandium nitrate solution of a volume equal to the pore volume of the carrier, then dried for 4 hours at 120° C. and calcinated for 4 hours at 550° C. to obtain catalyst A7 with Y content of 2% (wt) and Sc content of 3% (wt). The catalyst A7 was impregnated with chloroplatinic acid solution and palladium chloride solution of a volume equal to the pore volume of the carrier to obtain catalyst B7 with Pt content of 0.1% (wt) and Pd content of 0.2% (wt).

Example 8I

Alumina ball carrier (20 g) was impregnated with yttrium nitrate solution and scandium nitrate solution of a volume equal to the pore volume of the carrier, then dried for 4 hours at 120° C. and calcinated for 4 hours at 550° C. to obtain catalyst A8 with Y content of 2% (wt) and Sc content of 3% (wt). The catalyst A8 was impregnated with chloroplatinic acid solution and chloroiridic acid solution of a volume equal to the pore volume of the carrier to obtain catalyst B8 with Pt content of 0.1% (wt) and Ir content of 0.2% (wt).

Example 9I

Alumina ball carrier (20 g) was impregnated with yttrium nitrate solution and scandium nitrate solution of a volume equal to the pore volume of the carrier, then dried for 4 hours at 120° C. and calcinated for 4 hours at 550° C. to obtain catalyst A9 with Y content of 2% (wt) and Sc content of 3% (wt). The catalyst A9 was impregnated with chloroplatinic acid solution and palladium chloride solution of a volume equal to the pore volume of the carrier to obtain catalyst B9 with Pt content of 0.05% (wt) and Pd content of 0.25% (wt).

Example 10I

Alumina ball carrier (20 g) was impregnated with yttrium nitrate solution and scandium nitrate solution of a volume equal to the pore volume of the carrier, then dried for 4 hours at 120° C. and calcinated for 4 hours at 550° C. to obtain catalyst A10 with Y content of 2% (wt) and Sc content of 3% (wt). The catalyst A10 was impregnated with chloroplatinic acid solution and palladium chloride solution of a volume equal to the pore volume of the carrier to obtain catalyst B10 with Pt content of 0.2% (wt) and Pd content of 0.1% (wt).

Example 11I

Alumina ball carrier (20 g) was impregnated with yttrium nitrate solution and scandium nitrate solution of a volume equal to the pore volume of the carrier, then dried for 4 hours at 120° C. and calcinated for 4 hours at 550° C. to obtain catalyst A11 with Y content of 1% (wt) and Sc content of 4% (wt). The catalyst A11 was impregnated with chloroplatinic acid solution and palladium chloride solution of a volume equal to the pore volume of the carrier to obtain catalyst B11 with Pt content of 0.05% (wt) and Pd content of 0.25% (wt).

Example 12I

Alumina ball carrier (20 g) was impregnated with yttrium nitrate solution and scandium nitrate solution of a volume equal to the pore volume of the carrier, then dried for 4 hours at 120° C. and calcinated for 4 hours at 550° C. to obtain catalyst A12 with Y content of 4% (wt) and Sc content of 1% (wt). The catalyst A12 was impregnated with chloroplatinic acid solution and palladium chloride solution of a volume equal to the pore volume of the carrier to obtain catalyst B12 with Pt content of 0.05% (wt) and Pd content of 0.25% (wt).

Example 13I

Alumina ball carrier (20 g) was impregnated with yttrium nitrate solution and scandium nitrate solution of a volume equal to the pore volume of the carrier, then dried for 4 hours at 120° C. and calcinated for 4 hours at 550° C. to obtain catalyst A13 with Y content of 2% (wt) and Sc content of 3% (wt). The catalyst A13 was impregnated with chloroplatinic acid solution and palladium chloride solution of a volume equal to the pore volume of the carrier to obtain catalyst B13 with Pt content of 0.03% (wt) and Pd content of 0.27% (wt).

Example 14I

Amorphous silica-alumina ball carrier (20 g) was impregnated with yttrium nitrate solution and scandium nitrate solution of a volume equal to the pore volume of the carrier, then dried for 4 hours at 120° C. and calcinated for 4 hours at 550° C. to obtain catalyst A14 with Y content of 2% (wt) and Sc content of 3% (wt). The catalyst A14 was impregnated with chloroplatinic acid solution and palladium chloride solution of a volume equal to the pore volume of the carrier to obtain catalyst B14 with Pt content of 0.05% (wt) and Pd content of 0.25% (wt).

Example 15I

Shaped carrier of high silicon mordenite (Si/Al=50) and alumina (20 g) was impregnated with yttrium nitrate solution and scandium nitrate solution of a volume equal to the pore volume of the carrier, then dried for 4 hours at 120° C. and calcinated for 4 hours at 550° C. to obtain catalyst A15 with Y content of 2% (wt) and Sc content of 3% (wt). The catalyst A15 was impregnated with chloroplatinic acid solution and palladium chloride solution of a volume equal to the pore volume of the carrier to obtain catalyst B15 with Pt content of 0.05% (wt) and Pd content of 0.25% (wt).

Comparative Example 1I

Alumina ball carrier (20 g) was impregnated with chloroplatinic acid solution of a volume equal to the pore volume of the carrier to obtain catalyst B16 with Pt content of 0.03%.

Comparative Example 2I

Alumina ball carrier (20 g) was impregnated with chloroplatinic acid solution and palladium chloride solution of a volume equal to the pore volume of the carrier to obtain catalyst B17 with Pt content of 0.05% (wt) and Pd content of 0.25% (wt).

Comparative Example 3I

Alumina ball carrier (20 g) was impregnated with yttrium nitrate solution and scandium nitrate solution of a volume equal to the pore volume of the carrier, then dried for 4 hours at 120° C. and calcinated for 4 hours at 550° C. to obtain catalyst B18 with Y content of 2% (wt) and Sc content of 3% (wt).

The catalysts prepared in Examples 1I to 15I and Comparative Examples 1I to 3I are evaluated by a following method. Catalyst (5 g) was placed in a reactor, and hydrogen was fed therein. Reduction reaction was performed for 3 hours at 450° C., and then a temperature thereof was reduced to 350° C. Hydrogen and materials containing toluene and naphthalene are fed therein and contact with the catalyst, and reaction activity was measured. Reaction conditions: a total weight airspeed was 10 $h^{-1}$; a reaction temperature was 350° C.; a reaction pressure was 3.0 MPa; and a molecular ratio of hydrogen to hydrocarbon was 3.0. In raw materials, toluene:naphthalene=90:10 (wt). The reaction performances are shown in Table 8.

TABLE 8

| Examples | Component (2)/content (wt %) | Component (1)/content (wt %) | Hydrogen desorption temperature (° C.) | Toluene hydrogenation ratio (R1) wt % | Naphthalene hydrogenation ratio (R2) wt % | R2/R1 |
|---|---|---|---|---|---|---|
| 1I | Y/5.0 | Pt/0.3 | 361 | 2.4 | 56.3 | 23.5 |
| 2I | Sc/5.0 | Pt/0.3 | 359 | 2.5 | 55.9 | 22.4 |
| 3I | Y/5.0 | Pd/0.3 | 372 | 1.9 | 51.4 | 27.1 |
| 4I | Y/5.0 | Ir/0.3 | 374 | 1.6 | 50.9 | 31.8 |
| 5I | Y/5.0 | Pt/0.1-Pd/0.2 | 365 | 2.0 | 58.6 | 29.3 |
| 6I | Y/2.0-Sc/3.0 | Pt/0.3 | 370 | 1.7 | 58.1 | 34.2 |
| 7I | Y/2.0-Sc/3.0 | Pt/0.1-Pd/0.2 | 379 | 1.3 | 64.3 | 49.5 |
| 8I | Y/2.0-Sc/3.0 | Pt/0.1-Ir/0.2 | 380 | 1.2 | 56.3 | 46.9 |
| 9I | Y/2.0-Sc/3.0 | Pt/0.05-Pd/0.25 | 382 | 1.2 | 63.8 | 53.2 |
| 10I | Y/2.0-Sc/3.0 | Pt/0.2-Pd/0.1 | 368 | 1.8 | 63.9 | 35.5 |
| 11I | Y/2.0-Sc/3.0 | Pd/0.1-Ir/0.2 | 387 | 1.1 | 60.5 | 55.0 |
| 12I | Y/1.0-Sc/4.0 | Pt/0.05-Pd/0.25 | 381 | 1.3 | 61.8 | 47.5 |
| 13I | Y/4.0-Sc/1.0 | Pt/0.05-Pd/0.25 | 385 | 1.2 | 62.5 | 52.1 |
| 14I | Y/2.0-Sc/3.0 | Pt/0.05-Pd/0.25 | 383 | 1.3 | 64.1 | 49.3 |
| 15I | Y/2.0-Sc/3.0 | Pt/0.05-Pd/0.25 | 378 | 1.7 | 65.8 | 38.7 |
| Comparative Example 1I | / | Pt/0.3 | 350 | 38.6 | 53.3 | 1.4 |
| Comparative Example 2I | / | Pt/0.05-Pd/0.25 | 361 | 10.3 | 56.8 | 5.5 |
| Comparative Example 3I | Y/2.0-Sc/3.0 | / | 298 | 0.6 | 4.8 | 8.0 |

The present disclosure is illustrated in detail in combination with preferred embodiments hereinabove, but it can be understood that the embodiments disclosed herein can be improved or substituted without departing from the protection scope of the present disclosure. In particular, as long as there are no structural conflicts, the technical features disclosed in each and every embodiment of the present disclosure can be combined with one another in any way, and the combined features formed thereby are within the protection scope of the present disclosure. The present disclosure does not describe the combinations of these features in an exhaustive manner for conciseness. The present disclosure is not limited by the specific embodiments disclosed herein, but includes all technical solutions falling into the protection scope of the claims.

The invention claimed is:

1. A catalyst, comprising a carrier, component I, and component II,
wherein component I comprises Pt and Pd, Pt and Ir, Pd and Ir, or a combination of Pt, Pd, and Ir, and component II comprises a combination of W and Mo, a combination of Cu and Zn, a combination of Ag and Zn, a combination of Fe and Ni, a combination of Mg and Sr, a combination of La and Ce, a combination of Ga and Sn, a combination of Zr and Nb, or a combination of Y and Sc, and
wherein the catalyst has a hydrogen desorption temperature higher than 350° C.

2. The catalyst according to claim 1, wherein component I comprises Pt and Pd.

3. The catalyst according to claim 2, wherein a weight ratio of Pt to Pd is in the range of 0.1:1 to 5:1.

4. The catalyst according to claim 1, wherein:
in the combination of W and Mo, a weight ratio of W to Mo is in a range of 0.1:1 to 10:1,
in the combination of Cu and Zn, a weight ratio of Cu to Zn is in a range of 0.1:1 to 10:1,
in the combination of Ag and Zn, a weight ratio of Ag to Zn is in a range of 0.1:1 to 10:1,
in the combination of Fe and Ni, a weight ratio of Fe to Ni is in a range of 0.1:1 to 10:1,
in the combination of Mg and Sr, a weight ratio of Mg to Sr is in a range of 0.1:1 to 10:1,
in the combination of La and Ce, a weight ratio of La to Ce is in a range of 0.1:1 to 10:1,
in the combination of Ga and Sn, a weight ratio of Ga to Sn is in a range of 0.1:1 to 10:1,
in the combination of Zr and Nb, a weight ratio of Zr to Nb is in a range of 0.1:1 to 10:1, and
in the combination of Y and Sc, a weight ratio of Y to Sc is in a range of 0.1:1 to 10:1.

5. The catalyst according to claim 1, wherein component I accounts for 0.02-3.0 wt % of the catalyst, and component II accounts for 0.01-15 wt % of the catalyst.

6. The catalyst according to claim 1, wherein a weight ratio of component I to component II is in the range of 0.1:1 to 10:1.

7. The catalyst according to claim 1, wherein the carrier is a non-acidic or weakly acidic porous carrier.

8. The catalyst according to claim 7, wherein the carrier is an L acid additive modified carrier.

9. The catalyst according to claim 8, wherein the L acid additive comprises a chloride-containing compound and a fluorine-containing compound.

10. The catalyst according to claim 9, wherein the chloride-containing compound comprises at least one selected from a group consisting of $AlCl_3$, $CuCl_2$, $FeCl_3$, $SnCl_4$, $TiCl_4$, and $SbCl_5$, and the fluorine-containing compound comprises at least one selected from a group consisting of $BF_3$, $NbF_5$, $SbF_5$, $TaF_5$, and $AsF_5$.

11. The catalyst according to claim 10, wherein the L acid additive comprises $AlCl_3$ and $NbF_5$.

12. The catalyst according to claim 9, wherein a weight ratio of the chloride-containing compound to the fluorine-containing compound is in the range of 0.1:1 to 10:1.

13. The catalyst according to claim 8, wherein the L acid additive accounts for 0.01-20 wt % of the catalyst.

14. The catalyst according to claim 8, wherein the L acid additive comprises at a chloride-containing compound, a fluorine-containing compound, or both.

15. The catalyst according to claim 7, wherein the carrier comprises at least one member selected from a group consisting of alumina, amorphous silica-alumina, kaolin, and aluminosilicate.

16. The catalyst according to claim 1, wherein the catalyst has a hydrogen desorption temperature higher than 380° C.

17. A method for preparing the catalyst according to claim 1, comprising:
step A), loading a salt containing component II into a carrier, and performing drying and calcination to obtain a catalyst precursor; and
step B), loading a salt containing component I into the catalyst precursor prepared in step A), and performing drying and calcination of the catalyst precursor loaded with the salt containing component I.

18. The method according to claim 17, wherein in step A) and step B), the calcination is performed at a temperature ranging from 400° C. to 600° C.

19. The method according to claim 17, wherein in step A), the salt containing component II is dissolved in water or an organic solvent, and is loaded into the carrier by precipitation, physical bonding, or dipping; and in step B), the salt containing component I is dissolved in water or an organic solvent, and is loaded into the catalyst precursor by precipitation, physical bonding, or dipping.

20. The catalyst according to claim 19, wherein the organic solvent used in step A) or step B) is independently selected from the group consisting of alcohols, ketones and hydrocarbons.

21. The catalyst according to claim 19, wherein the organic solvent used in step A) or step B) is independently selected from the group consisting of ethanol, acetone, cyclohexane, n-heptane, and toluene.

22. A method for producing light aromatics with heavy aromatics, comprising subjecting a raw material containing heavy aromatics to hydrogenation reaction in the presence of the catalyst according to claim 1.

23. The method according to claim 22, wherein a reaction temperature is in the range of 100° C. to 500° C., a reaction pressure is in the range of 0.5 MPa to 8.0 MPa, a molar ratio of hydrogen to heavy aromatics is in the range of 1 to 10; and a feed weight airspeed is in the range of $0.5^{-1}$ to $20^{-1}$.

24. The method according to claim 22, wherein the heavy aromatics are polycyclic aromatics comprising at least one compound selected from a group consisting of naphthalene, anthracene, phenanthrene, and homologues thereof.

* * * * *